(12) United States Patent
Khoshnevisan et al.

(10) Patent No.: US 11,728,933 B2
(45) Date of Patent: Aug. 15, 2023

(54) CODE-BLOCK-GROUP ACKNOWLEDGMENT FEEDBACK TECHNIQUES IN WIRELESS COMMUNICATIONS

(71) Applicant: QUALCOMM Incorporated, San Diego, CA (US)

(72) Inventors: Mostafa Khoshnevisan, San Diego, CA (US); Jing Sun, San Diego, CA (US); Kapil Bhattad, Bangalore (IN); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 146 days.

(21) Appl. No.: 17/324,625

(22) Filed: May 19, 2021

(65) Prior Publication Data
US 2021/0336721 A1  Oct. 28, 2021

Related U.S. Application Data

(63) Continuation of application No. 16/899,548, filed on Jun. 11, 2020, now Pat. No. 11,032,029.

(30) Foreign Application Priority Data

Jul. 9, 2019 (IN) .............................. 201941027427

(51) Int. Cl.
*H04L 12/28* (2006.01)
*H04L 1/1607* (2023.01)
(Continued)

(52) U.S. Cl.
CPC ......... *H04L 1/1621* (2013.01); *H04B 7/0456* (2013.01); *H04W 72/1273* (2013.01); *H04W 72/23* (2023.01)

(58) Field of Classification Search
CPC .... H04L 1/1621; H04L 1/1896; H04L 5/0055
(Continued)

(56) References Cited

U.S. PATENT DOCUMENTS

2019/0074952 A1  3/2019 Bhattad et al.
2019/0103943 A1  4/2019 Wang et al.
(Continued)

FOREIGN PATENT DOCUMENTS

| EP | 3471309 A1 | 4/2019 |
|---|---|---|
| WO | WO2018129017 A2 | 7/2018 |
| WO | WO2018203612 A1 | 11/2018 |

OTHER PUBLICATIONS

International Search Report and Written Opinion—PCT/US2020/037567—ISA/EPO—dated Sep. 24, 2020.

*Primary Examiner* — John Pezzlo
(74) *Attorney, Agent, or Firm* — Holland & Hart LLP

(57) ABSTRACT

Methods, systems, and devices for wireless communications are described that support group-based acknowledgment feedback techniques. Two or more different groups of downlink transmissions may each have an associated transport block (TB) level or code block group (CBG) level group-based acknowledgment feedback, and a base station may transmit downlink control information to a UE that indicates one or more parameters that are used to determine which downlink transmissions are to be reported in the group-based feedback at a TB level, CBG level, or combinations thereof. Based on the parameters in the downlink control information, the UE may determine the feedback to be reported, and a timing for when to transmit the feedback to the base station.

14 Claims, 18 Drawing Sheets

(51) Int. Cl.
*H04W 72/1273* (2023.01)
*H04B 7/0456* (2017.01)
*H04W 72/23* (2023.01)
*H04J 1/16* (2006.01)

(58) Field of Classification Search
USPC .......................................... 370/252, 282, 329
See application file for complete search history.

(56) References Cited

U.S. PATENT DOCUMENTS

| | | | |
|---|---|---|---|
| 2019/0149271 A1* | 5/2019 | Yin ........................ | H04L 1/1861 |
| | | | 370/329 |
| 2020/0067530 A1* | 2/2020 | Xu ......................... | H04L 1/0041 |
| 2020/0313807 A1* | 10/2020 | Salem ................... | H04L 1/1607 |
| 2020/0374045 A1 | 11/2020 | Yin et al. | |
| 2021/0006356 A1 | 1/2021 | Khoshnevisan et al. | |
| 2021/0014004 A1 | 1/2021 | Khoshnevisan | |

* cited by examiner

CODE-BLOCK-GROUP ACKNOWLEDGMENT FEEDBACK TECHNIQUES IN WIRELESS COMMUNICATIONS

CROSS REFERENCE

The present Application for Patent is a Continuation of U.S. patent application Ser. No. 16/899,548 by Khoshnevisan et al., entitled "CODE-BLOCK-GROUP ACKNOWLEDGEMENT FEEDBACK TECHNIQUES IN WIRELESS COMMUNICATIONS" filed Jun. 11, 2020, which claims the benefit of Indian Provisional Patent Application No. 201941027427 by Khoshnevisan et al., entitled "CODE-BLOCK-GROUP ACKNOWLEDGMENT FEEDBACK TECHNIQUES IN WIRELESS COMMUNICATIONS," filed Jul. 9, 2019, assigned to the assignee hereof, and expressly incorporated by reference herein.

BACKGROUND

The following relates generally to wireless communications, and more specifically to code-block-group (CBG) acknowledgment feedback techniques in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems may support acknowledgment feedback to indicate if a wireless device (e.g., a UE) successfully decodes downlink messages (i.e., data transmissions) where the downlink message decoding is based on one or more detected downlink control messages (e.g., a downlink grant or downlink control information (DCI)). In deployments supporting shared or unlicensed radio frequency spectrums (e.g., unlicensed NR), one or more downlink messages may not be received correctly (e.g., due to a hidden interfering node) and the wireless device may not provide ACK feedback based on all of the downlink control messages. Further, in some cases a wireless device (e.g., a UE) may not be able to transmit ACK feedback when the medium is occupied by another wireless device (e.g., when a listen-before-talk (LBT) procedure fails). Techniques to enhance system performance in cases where one or more transmissions may not be sent or received are thus desirable.

SUMMARY

The described techniques relate to improved methods, systems, devices, and apparatuses that support CBG acknowledgment feedback techniques in wireless communications. In various aspects, group-based feedback may be provided in which a user equipment (UE) may transmit acknowledgment feedback (e.g., hybrid automatic repeat request (HARQ) feedback) for multiple downlink transmissions in a single uplink communication. In some cases, two or more different groups of downlink transmissions may each have an associated group-based acknowledgment feedback. In some cases, one or more of the groups of downlink transmissions may be configured for code-block-group (CBG) level acknowledgment feedback, in which feedback may be provided for each of multiple CBGs that may be associated with each transport block (TB). Further, one or more of the groups of downlink transmissions may be configured for TB based feedback, in which feedback may be provided for each TB that provides a downlink transmission.

In some cases, a base station may transmit downlink control information (DCI) to a UE that indicates one or more parameters that are used to determine CBG or TB level feedback for one or more groups of downlink transmissions. Based on the parameters in the DCI, the UE may determine the feedback to be reported, whether the feedback is to be provided at the CBG and/or TB level, and a timing for when to transmit the feedback to the base station. In some further aspects of the present disclosure, techniques are provided in which an uplink DCI that includes information for an uplink transmission that is to include group-based acknowledgment feedback may also provide downlink assignment indicator or index (DAI) values for one or more of the groups of downlink transmissions. A UE may determine a feedback codebook for providing the acknowledgment feedback based at least in part on the DAI provided in the uplink DCI.

A method of wireless communication at a UE is described. The method may include receiving, from a base station, configuration information for group-based acknowledgment feedback for one or more of a first group of downlink transmissions to the UE or a second group of downlink transmissions to the UE, where the one or more of the first group of downlink transmissions or the second group of downlink transmissions are configured for acknowledgment feedback at a code-block-group level, receiving a downlink control information transmission from the base station that indicates group-based acknowledgment feedback is to be provided for one or more of the first group of downlink transmissions or the second group of downlink transmissions in a first uplink transmission, determining, based on the configuration information for the group-based acknowledgment feedback, code-block-group level acknowledgment feedback associated with at least the first group of downlink transmissions, and transmitting the code-block-group level acknowledgment feedback to the base station in the first uplink transmission.

An apparatus for wireless communication at a UE is described. The apparatus may include a processor, memory coupled with the processor, and instructions stored in the memory. The instructions may be executable by the processor to cause the apparatus to receive, from a base station, configuration information for group-based acknowledgment feedback for one or more of a first group of downlink transmissions to the UE or a second group of downlink transmissions to the UE, where the one or more of the first group of downlink transmissions or the second group of downlink transmissions are configured for acknowledgment feedback at a code-block-group level, receive a downlink control information transmission from the base station that indicates group-based acknowledgment feedback is to be provided for one or more of the first group of downlink transmissions or the second group of downlink transmissions in a first uplink transmission, determine, based on the configuration information for the group-based acknowledgment feedback, code-block-group level acknowledgment feedback associated with at least the first group of downlink transmissions, and transmit the code-block-group level acknowledgment feedback to the base station in the first uplink transmission.

Another apparatus for wireless communication at a UE is described. The apparatus may include means for receiving, from a base station, configuration information for group-based acknowledgment feedback for one or more of a first group of downlink transmissions to the UE or a second group of downlink transmissions to the UE, where the one or more of the first group of downlink transmissions or the second group of downlink transmissions are configured for acknowledgment feedback at a code-block-group level, receiving a downlink control information transmission from the base station that indicates group-based acknowledgment feedback is to be provided for one or more of the first group of downlink transmissions or the second group of downlink transmissions in a first uplink transmission, determining, based on the configuration information for the group-based acknowledgment feedback, code-block-group level acknowledgment feedback associated with at least the first group of downlink transmissions, and transmitting the code-block-group level acknowledgment feedback to the base station in the first uplink transmission.

A non-transitory computer-readable medium storing code for wireless communication at a UE is described. The code may include instructions executable by a processor to receive, from a base station, configuration information for group-based acknowledgment feedback for one or more of a first group of downlink transmissions to the UE or a second group of downlink transmissions to the UE, where the one or more of the first group of downlink transmissions or the second group of downlink transmissions are configured for acknowledgment feedback at a code-block-group level, receive a downlink control information transmission from the base station that indicates group-based acknowledgment feedback is to be provided for one or more of the first group of downlink transmissions or the second group of downlink transmissions in a first uplink transmission, determine, based on the configuration information for the group-based acknowledgment feedback, code-block-group level acknowledgment feedback associated with at least the first group of downlink transmissions, and transmit the code-block-group level acknowledgment feedback to the base station in the first uplink transmission.

In some examples of the method, apparatuses, and non-transitory computer-readable medium described herein, the receiving the configuration information further may include operations, features, means, or instructions for receiving an indication that only a single group of downlink transmissions is configured for group-based acknowledgment feedback, and where code-block-group level acknowledgment feedback is allowed for the group-based acknowledgment feedback of the single group of downlink transmissions. In some examples of the method, apparatuses, and non-transitory computer-readable medium described herein, a first sub-codebook for code-block-group level acknowledgment feedback or a second sub-codebook for transport-block level acknowledgment feedback may be used to report the group-based acknowledgment feedback of the single group of downlink transmissions. In some examples of the method, apparatuses, and non-transitory computer-readable medium described herein, one or more of a downlink assignment indicator value or a new acknowledgment feedback indicator value may be applied separately to each of the first sub-codebook or the second sub-codebook.

In some examples of the method, apparatuses, and non-transitory computer-readable medium described herein, the receiving the configuration information further may include operations, features, means, or instructions for receiving an indication that only a single group of downlink transmissions is available for code-block-group level acknowledgment feedback, and that any other group of downlink transmissions is to use a transport-block level acknowledgment feedback. In some examples of the method, apparatuses, and non-transitory computer-readable medium described herein, the receiving the downlink control information further may include operations, features, means, or instructions for identifying a group indicator value in the downlink control information that indicates which of the code-block-group level or the transport-block level is to be used for the acknowledgment feedback for the associated group of downlink transmissions.

In some examples of the method, apparatuses, and non-transitory computer-readable medium described herein, the determining further may include operations, features, means, or instructions for identifying that a first group indicator value in the downlink control information indicates that code-block-group level acknowledgment feedback is to be provided for the first group of downlink transmissions, and determining acknowledgment feedback for the first group of downlink transmissions with code-block-group level acknowledgment irrespective of whether the first group of downlink transmissions is configured with transport-block level acknowledgment feedback or code-block-group level acknowledgment feedback.

In some examples of the method, apparatuses, and non-transitory computer-readable medium described herein, the determining further may include operations, features, means, or instructions for identifying that a second group indicator value in the downlink control information indicates that transport-block level acknowledgment feedback is to be provided for the first group of downlink transmissions, and determining acknowledgment feedback for the first group of downlink transmissions with transport-block level acknowledgment irrespective of whether the first group of downlink transmissions is configured with transport-block level acknowledgment feedback or code-block-group level acknowledgment feedback.

In some examples of the method, apparatuses, and non-transitory computer-readable medium described herein, a first sub-codebook is associated with code-block-group level acknowledgment feedback and a second sub-codebook is associated with transport-block level acknowledgment feedback, and the UE selects the first sub-codebook or the second sub-codebook based on the group indicator value.

In some examples of the method, apparatuses, and non-transitory computer-readable medium described herein, the receiving the configuration information further may include operations, features, means, or instructions for receiving an indication that either of the first group downlink transmissions or the second group of downlink transmissions is available for code-block-group level acknowledgment feedback, and where when code-block-group level acknowledgment feedback is configured for one group of downlink transmissions, other groups of downlink transmissions are to use a transport-block level acknowledgment feedback.

In some examples of the method, apparatuses, and non-transitory computer-readable medium described herein, a first sub-codebook is associated with transport-block level acknowledgment feedback associated with the second group of downlink transmissions configured for transport-block level acknowledgment feedback, a second sub-codebook is associated with transport-block level acknowledgment feedback associated with the first group of downlink transmissions configured for either code-block-group or transport-block level acknowledgment feedback, and a third sub-codebook is associated with code-block-group level acknowledgment feedback associated with the first group of downlink transmissions. Some examples of the method, apparatuses, and non-transitory computer-readable medium described herein may further include operations, features, means, or instructions for identifying a group indicator value in the downlink control information that indicates that first acknowledgment feedback for the second group of downlink transmissions is to be reported at the transport-block level, and a request indicator that indicates second acknowledgment feedback for the first group of downlink transmissions is to be provided with the first acknowledgment feedback, and determining, based on the group indicator value, that the first sub-codebook is to be used for the second group of downlink transmissions and the second sub-codebook is to be used for the first group of downlink transmissions.

In some examples of the method, apparatuses, and non-transitory computer-readable medium described herein, the receiving the downlink control information transmission further may include operations, features, means, or instructions for receiving a first downlink assignment indictor that indicates a first number of downlink transmissions of the second group of downlink transmissions and a second downlink assignment indictor that indicates a second number of downlink transmissions of the first group of downlink transmissions.

Some examples of the method, apparatuses, and non-transitory computer-readable medium described herein may further include operations, features, means, or instructions for identifying a group indicator value in the downlink control information that indicates that first acknowledgment feedback for the second group of downlink transmissions is to be reported at the transport-block level and that second acknowledgment feedback for the first group of downlink transmissions is to be reported at the code-block-group level and provided with the first acknowledgment feedback, and determining, based on the group indicator value, that the first sub-codebook is to be used for the second group of downlink transmissions and the second sub-codebook is to be used for the first group of downlink transmissions.

In some examples of the method, apparatuses, and non-transitory computer-readable medium described herein, the receiving the downlink control information transmission further may include operations, features, means, or instructions for receiving a first downlink assignment indictor that indicates a first number of downlink transmissions of the second group of downlink transmissions and a second downlink assignment indictor that indicates a second number of downlink transmissions with code-block-group level acknowledgement feedback of the first group of downlink transmissions.

Some examples of the method, apparatuses, and non-transitory computer-readable medium described herein may further include operations, features, means, or instructions for identifying a group indicator value in the downlink control information that indicates that first acknowledgment feedback for the second group of downlink transmissions is to be reported at the transport-block level, and that indicates that second acknowledgment feedback for the first group of downlink transmissions is to be reported at both the code-block-group level and the transport-block level and provided with the first acknowledgment feedback, and determining, based on the group indicator value, that the first sub-codebook is to be used for the second group of downlink transmissions and that both the second sub-codebook and the third sub-codebook are to be used for the first group of downlink transmissions.

In some examples of the method, apparatuses, and non-transitory computer-readable medium described herein, the receiving the downlink control information transmission further may include operations, features, means, or instructions for receiving a first downlink assignment indictor that indicates a first number of downlink transmissions of the second group of downlink transmissions, a second downlink assignment indictor that indicates a second number of downlink transmissions of the first group of downlink transmissions with transport-block level acknowledgement feedback and a third downlink assignment indictor that indicates a third number of downlink transmissions of the first group of downlink transmissions with code-block-group level acknowledgement feedback.

Some examples of the method, apparatuses, and non-transitory computer-readable medium described herein may further include operations, features, means, or instructions for receiving only a first downlink assignment indictor that indicates a first number of transmissions of the second group of downlink transmissions, and determining a second number of transmissions of the first group of downlink transmissions based on the previous DCIs scheduling downlink transmissions for the first group of downlink transmissions.

In some examples of the method, apparatuses, and non-transitory computer-readable medium described herein, the receiving the configuration information further may include operations, features, means, or instructions for receiving an indication that either of the first group downlink transmissions or the second group of downlink transmissions are available for code-block-group level acknowledgment feedback or transport-block level acknowledgment feedback.

In some examples of the method, apparatuses, and non-transitory computer-readable medium described herein, four sub-codebooks may be available for use in transmitting the group-based acknowledgment feedback, based on which of code-block-group based feedback or transport-block based feedback may be to be provided for each of the first group of downlink transmissions and the second group of downlink transmissions.

In some examples of the method, apparatuses, and non-transitory computer-readable medium described herein, the determining further may include operations, features, means, or instructions for determining which of the four sub-codebooks is to be used for providing acknowledgment feedback associated with the first group of downlink transmissions and the second group of downlink transmissions based on one or more of which group of downlink transmissions is associated with the downlink control information that indicates that the group-based acknowledgment feedback is to be transmitted, one or more downlink assignment indicators that indicates a number of downlink transmissions with either code-block-groups or transport-blocks acknowledgment feedback that is associated with each of the first group of downlink transmissions or the second group of downlink transmissions, or any combinations thereof.

A method of wireless communication at a UE is described. The method may include receiving, from a base station, configuration information for group-based acknowledgment feedback for at least a first group of downlink transmissions to the UE and a second group of downlink transmissions to the UE, where one or more of the first group of downlink transmissions or the second group of downlink transmissions are configured for acknowledgment feedback at a code-block-group level or a transport-block level, receiving a downlink control information transmission from the base station that schedules a first uplink transmission in which acknowledgment feedback for one or more of the first group of downlink transmissions or the second group of downlink transmissions is to be multiplexed with uplink data in the first uplink transmission, where the downlink control information further indicates group-based acknowledgment feedback is to be provided for one or more of the first group of downlink transmissions or the second group of downlink transmissions, in the first uplink transmission, determining, based on the configuration information for the group-based acknowledgment feedback and the downlink control information, acknowledgment feedback associated with at least one of the first group of downlink transmissions or the second group of downlink transmissions, and transmitting the acknowledgment feedback to the base station in the first uplink transmission.

An apparatus for wireless communication at a UE is described. The apparatus may include a processor, memory coupled with the processor, and instructions stored in the memory. The instructions may be executable by the processor to cause the apparatus to receive, from a base station, configuration information for group-based acknowledgment feedback for at least a first group of downlink transmissions to the UE and a second group of downlink transmissions to the UE, where one or more of the first group of downlink transmissions or the second group of downlink transmissions are configured for acknowledgment feedback at a code-block-group level or a transport-block level, receive a downlink control information transmission from the base station that schedules a first uplink transmission in which acknowledgment feedback for one or more of the first group of downlink transmissions or the second group of downlink transmissions is to be multiplexed with uplink data in the first uplink transmission, where the downlink control information further indicates group-based acknowledgment feedback is to be provided for one or more of the first group of downlink transmissions or the second group of downlink transmissions, in the first uplink transmission, determine, based on the configuration information for the group-based acknowledgment feedback and the downlink control information, acknowledgment feedback associated with at least one of the first group of downlink transmissions or the second group of downlink transmissions, and transmit the acknowledgment feedback to the base station in the first uplink transmission.

Another apparatus for wireless communication at a UE is described. The apparatus may include means for receiving, from a base station, configuration information for group-based acknowledgment feedback for at least a first group of downlink transmissions to the UE and a second group of downlink transmissions to the UE, where one or more of the first group of downlink transmissions or the second group of downlink transmissions are configured for acknowledgment feedback at a code-block-group level or a transport-block level, receiving a downlink control information transmission from the base station that schedules a first uplink transmission in which acknowledgment feedback for one or more of the first group of downlink transmissions or the second group of downlink transmissions is to be multiplexed with uplink data in the first uplink transmission, where the downlink control information further indicates group-based acknowledgment feedback is to be provided for one or more of the first group of downlink transmissions or the second group of downlink transmissions, in the first uplink transmission, determining, based on the configuration information for the group-based acknowledgment feedback and the downlink control information, acknowledgment feedback associated with at least one of the first group of downlink transmissions or the second group of downlink transmissions, and transmitting the acknowledgment feedback to the base station in the first uplink transmission.

A non-transitory computer-readable medium storing code for wireless communication at a UE is described. The code may include instructions executable by a processor to receive, from a base station, configuration information for group-based acknowledgment feedback for at least a first group of downlink transmissions to the UE and a second group of downlink transmissions to the UE, where one or more of the first group of downlink transmissions or the second group of downlink transmissions are configured for acknowledgment feedback at a code-block-group level or a transport-block level, receive a downlink control information transmission from the base station that schedules a first uplink transmission in which acknowledgment feedback for one or more of the first group of downlink transmissions or the second group of downlink transmissions is to be multiplexed with uplink data in the first uplink transmission, where the downlink control information further indicates group-based acknowledgment feedback is to be provided for one or more of the first group of downlink transmissions or the second group of downlink transmissions, in the first uplink transmission, determine, based on the configuration information for the group-based acknowledgment feedback and the downlink control information, acknowledgment feedback associated with at least one of the first group of downlink transmissions or the second group of downlink transmissions, and transmit the acknowledgment feedback to the base station in the first uplink transmission.

In some examples of the method, apparatuses, and non-transitory computer-readable medium described herein, the receiving the downlink control information further may include operations, features, means, or instructions for receiving uplink total downlink assignment indicator fields for each of the first group of downlink transmissions and the second group of downlink transmissions, and where the acknowledgment feedback is determined based on the uplink total downlink assignment indicator fields.

In some examples of the method, apparatuses, and non-transitory computer-readable medium described herein, the uplink total downlink assignment indicator fields for each of the first group of downlink transmissions and the second group of downlink transmissions include one or more of a first downlink assignment indicator field associated with a first codebook for transport-block level acknowledgment feedback of the first group of downlink transmissions or a second downlink assignment indicator field associated with a second codebook for code-block-group level acknowledgment feedback of the first group of downlink transmissions, and one or more of a third downlink assignment indicator field associated with a third codebook for transport-block level acknowledgment feedback of the second group of downlink transmissions or a fourth downlink assignment indicator field associated with a fourth codebook for code-block-group level acknowledgment feedback of the second group of downlink transmissions.

In some examples of the method, apparatuses, and non-transitory computer-readable medium described herein, the determining further may include operations, features, means, or instructions for determining, based on the uplink total downlink assignment indicator fields, that scheduling information from the base station was missed for one or more downlink transmissions of the first group of downlink transmissions, and inserting a predetermined value for one or more feedback indicators associated with the missed scheduling information to provide a codebook size that corresponds with the uplink total downlink assignment indicator fields.

In some examples of the method, apparatuses, and non-transitory computer-readable medium described herein, the receiving the downlink control information further may include operations, features, means, or instructions for receiving a first uplink total downlink assignment indicator field for transport-block based uplink acknowledgment feedback for the first group of downlink transmissions or the second group of downlink transmissions, and a second uplink total downlink assignment indicator field for code-block-group based uplink acknowledgment feedback for the first group of downlink transmissions or the second group of downlink transmissions.

In some examples of the method, apparatuses, and non-transitory computer-readable medium described herein, the first uplink total downlink assignment indicator field indicates a first number of downlink transmissions of one of the first group of downlink transmissions or the second group of downlink transmissions to be included in the acknowledgment feedback, and where a second number of downlink transmissions of the other group of downlink transmissions to be included in the acknowledgment feedback is determined based on a downlink transmission from the base station that scheduled a latest downlink transmission of the other group of downlink transmissions.

Some examples of the method, apparatuses, and non-transitory computer-readable medium described herein may further include operations, features, means, or instructions for determining which of the first group of downlink transmissions or the second group of downlink transmissions is associated with the first uplink total downlink assignment indicator field based on feedback for which of the first group of downlink transmissions or the second group of downlink transmissions is scheduled to be included in the acknowledgment feedback.

Some examples of the method, apparatuses, and non-transitory computer-readable medium described herein may further include operations, features, means, or instructions for determining which of the first group of downlink transmissions or the second group of downlink transmissions is associated with the first uplink total downlink assignment indicator field based on a fixed association between the first uplink total downlink assignment indicator field and one of the first group of downlink transmissions or the second group of downlink transmissions.

In some examples of the method, apparatuses, and non-transitory computer-readable medium described herein, the fixed association is between the first uplink total downlink assignment indicator field and the first group of downlink transmissions.

In some examples of the method, apparatuses, and non-transitory computer-readable medium described herein, the first uplink total downlink assignment indicator field and the second uplink total downlink assignment indicator field each indicate an aggregate total number of number of downlink transmissions from both of the first group of downlink transmissions and the second group of downlink transmissions to be included in the acknowledgment feedback.

In some examples of the method, apparatuses, and non-transitory computer-readable medium described herein, the determining further may include operations, features, means, or instructions for determining, based on the aggregate total number of downlink transmissions and downlink assignment indicators of a latest scheduled downlink transmission for each of the first group of downlink transmissions and the second group of downlink transmissions, a first number of downlink transmissions of the first group of downlink transmissions and a second number downlink transmissions of the second group of downlink transmissions to be included in the acknowledgment feedback.

In some examples of the method, apparatuses, and non-transitory computer-readable medium described herein, the determining further may include operations, features, means, or instructions for determining, based on one or more of the first uplink total downlink assignment indicator field or the second uplink total assignment indicator field, that scheduling information from the base station was missed for one or more downlink transmissions of the first group or second group of downlink transmissions, and inserting a predetermined value for one or more feedback indicators associated with the missed scheduling information to provide a codebook size that corresponds with the first uplink total downlink assignment indicator field.

In some examples of the method, apparatuses, and non-transitory computer-readable medium described herein, when code-block-group based acknowledgment feedback is not enabled, the first uplink total downlink assignment indicator field indicates a first number of transport-block based downlink transmissions of the first group of downlink transmissions to be included in the acknowledgment feedback, and the second uplink total downlink assignment indicator field indicates a second number of transport-block based downlink transmissions of the second group of downlink transmissions to be included in the acknowledgment feedback.

A method of wireless communication at a base station is described. The method may include transmitting, to a user equipment (UE), configuration information for group-based acknowledgment feedback for at least a first group of downlink transmissions to the UE and a second group of downlink transmissions to the UE, where one or more of the first group of downlink transmissions or the second group of downlink transmissions are configured for acknowledgment feedback at a code-block-group level or a transport-block level, transmitting a downlink control information transmission to the UE that schedules a first uplink transmission in which acknowledgment feedback for one or more of the first group of downlink transmissions or the second group of downlink transmissions is to be multiplexed with uplink data in the first uplink transmission, where the downlink control information further indicates group-based acknowledgment feedback is to be provided for at least one of the first group of downlink transmissions or the second group of downlink transmissions, and receiving the acknowledgment feedback from the UE in the first uplink transmission.

An apparatus for wireless communication at a base station is described. The apparatus may include a processor, memory coupled with the processor, and instructions stored in the memory. The instructions may be executable by the processor to cause the apparatus to transmit, to a user equipment (UE), configuration information for group-based acknowledgment feedback for at least a first group of downlink transmissions to the UE and a second group of downlink transmissions to the UE, where one or more of the first group of downlink transmissions or the second group of downlink transmissions are configured for acknowledgment feedback at a code-block-group level or a transport-block level, transmit a downlink control information transmission to the UE that schedules a first uplink transmission in which acknowledgment feedback for one or more of the first group of downlink transmissions or the second group of downlink transmissions is to be multiplexed with uplink data in the first uplink transmission, where the downlink control information further indicates group-based acknowledgment feedback is to be provided for at least one of the first group of downlink transmissions or the second group of downlink transmissions, and receive the acknowledgment feedback from the UE in the first uplink transmission.

Another apparatus for wireless communication at a base station is described. The apparatus may include means for transmitting, to a user equipment (UE), configuration information for group-based acknowledgment feedback for at least a first group of downlink transmissions to the UE and a second group of downlink transmissions to the UE, where one or more of the first group of downlink transmissions or the second group of downlink transmissions are configured for acknowledgment feedback at a code-block-group level or a transport-block level, transmitting a downlink control information transmission to the UE that schedules a first uplink transmission in which acknowledgment feedback for one or more of the first group of downlink transmissions or the second group of downlink transmissions is to be multiplexed with uplink data in the first uplink transmission, where the downlink control information further indicates group-based acknowledgment feedback is to be provided for at least one of the first group of downlink transmissions or the second group of downlink transmissions, and receiving the acknowledgment feedback from the UE in the first uplink transmission.

A non-transitory computer-readable medium storing code for wireless communication at a base station is described. The code may include instructions executable by a processor to transmit, to a user equipment (UE), configuration information for group-based acknowledgment feedback for at least a first group of downlink transmissions to the UE and a second group of downlink transmissions to the UE, where one or more of the first group of downlink transmissions or the second group of downlink transmissions are configured for acknowledgment feedback at a code-block-group level or a transport-block level, transmit a downlink control information transmission to the UE that schedules a first uplink transmission in which acknowledgment feedback for one or more of the first group of downlink transmissions or the second group of downlink transmissions is to be multiplexed with uplink data in the first uplink transmission, where the downlink control information further indicates group-based acknowledgment feedback is to be provided for at least one of the first group of downlink transmissions or the second group of downlink transmissions, and receive the acknowledgment feedback from the UE in the first uplink transmission.

Some examples of the method, apparatuses, and non-transitory computer-readable medium described herein may further include operations, features, means, or instructions for determining to request CBG level acknowledgment feedback associated for at least the first group of downlink transmissions.

In some examples of the method, apparatuses, and non-transitory computer-readable medium described herein, transmitting the downlink control information further may include operations, features, means, or instructions for transmitting uplink total downlink assignment indicator fields for each of the first group of downlink transmissions and the second group of downlink transmissions, and wherein the acknowledgment feedback is determined based at least in part on the uplink total downlink assignment indicator fields.

In some examples of the method, apparatuses, and non-transitory computer-readable medium described herein, the uplink total downlink assignment indicator fields for each of the first group of downlink transmissions and the second group of downlink transmissions include one or more of a first downlink assignment indicator field associated with a first codebook for transport-block level acknowledgment feedback of the first group of downlink transmissions or a second downlink assignment indicator field associated with a second codebook for code-block-group level acknowledgment feedback of the first group of downlink transmissions, and one or more of a third downlink assignment indicator field associated with a third codebook for transport-block level acknowledgment feedback of the second group of downlink transmissions or a fourth downlink assignment indicator field associated with a fourth codebook for code-block-group level acknowledgment feedback of the second group of downlink transmissions.

In some examples of the method, apparatuses, and non-transitory computer-readable medium described herein, transmitting the downlink control information further may include operations, features, means, or instructions for transmitting a first uplink total downlink assignment indicator field for transport-block based uplink acknowledgment feedback for the first group of downlink transmissions or the second group of downlink transmissions, and a second uplink total downlink assignment indicator field for code-block-group based uplink acknowledgment feedback for the first group of downlink transmissions or the second group of downlink transmissions.

In some examples of the method, apparatuses, and non-transitory computer-readable medium described herein, the first uplink total downlink assignment indicator field indicates a first number of downlink transmissions of one of the first group of downlink transmissions or the second group of downlink transmissions to be included in the acknowledgment feedback.

In some examples of the method, apparatuses, and non-transitory computer-readable medium described herein, the first uplink total downlink assignment indicator field and the second uplink total downlink assignment indicator field each indicate an aggregate total number of number of downlink transmissions from both of the first group of downlink transmissions and the second group of downlink transmissions to be included in the acknowledgment feedback.

In some examples of the method, apparatuses, and non-transitory computer-readable medium described herein, when code-block-group based acknowledgment feedback is not enabled, the first uplink total downlink assignment indicator field indicates a first number of transport-block based downlink transmissions of the first group of downlink transmissions to be included in the acknowledgment feedback, and the second uplink total downlink assignment indicator field indicates a second number of transport-block based downlink transmissions of the second group of downlink transmissions to be included in the acknowledgment feedback.

acknowledgment feedback techniques in wireless communications in accordance with aspects of the present disclosure.

Figure 2:
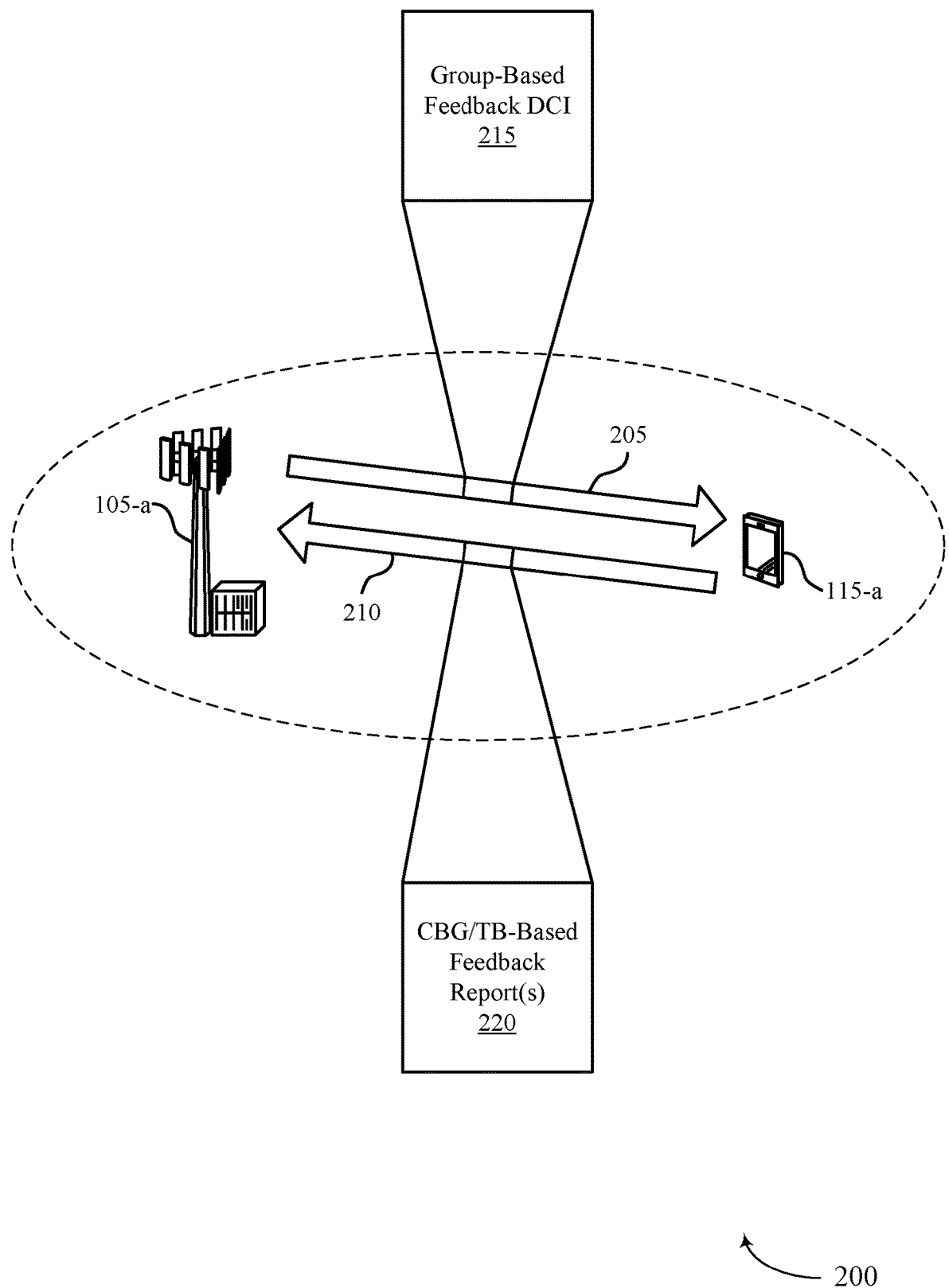

FIG. 2 illustrates an example of a portion of a wireless communications system that supports CBG acknowledgment feedback techniques in wireless communications in accordance with aspects of the present disclosure.

FIGS. 3 through 6 illustrate examples of feedback timelines that supports CBG acknowledgment feedback techniques in wireless communications in accordance with aspects of the present disclosure.

Figure 7:
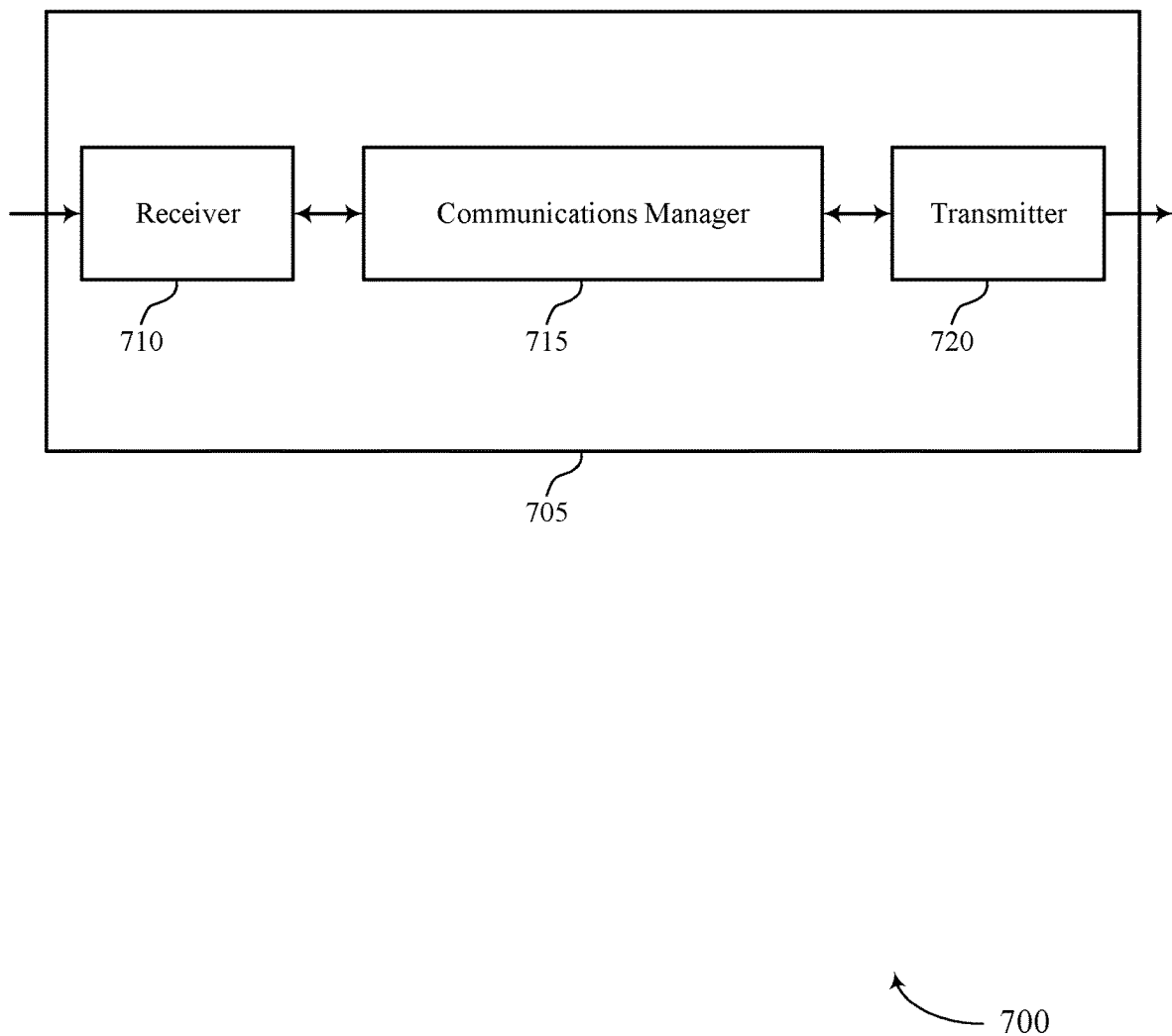
Figure 8:
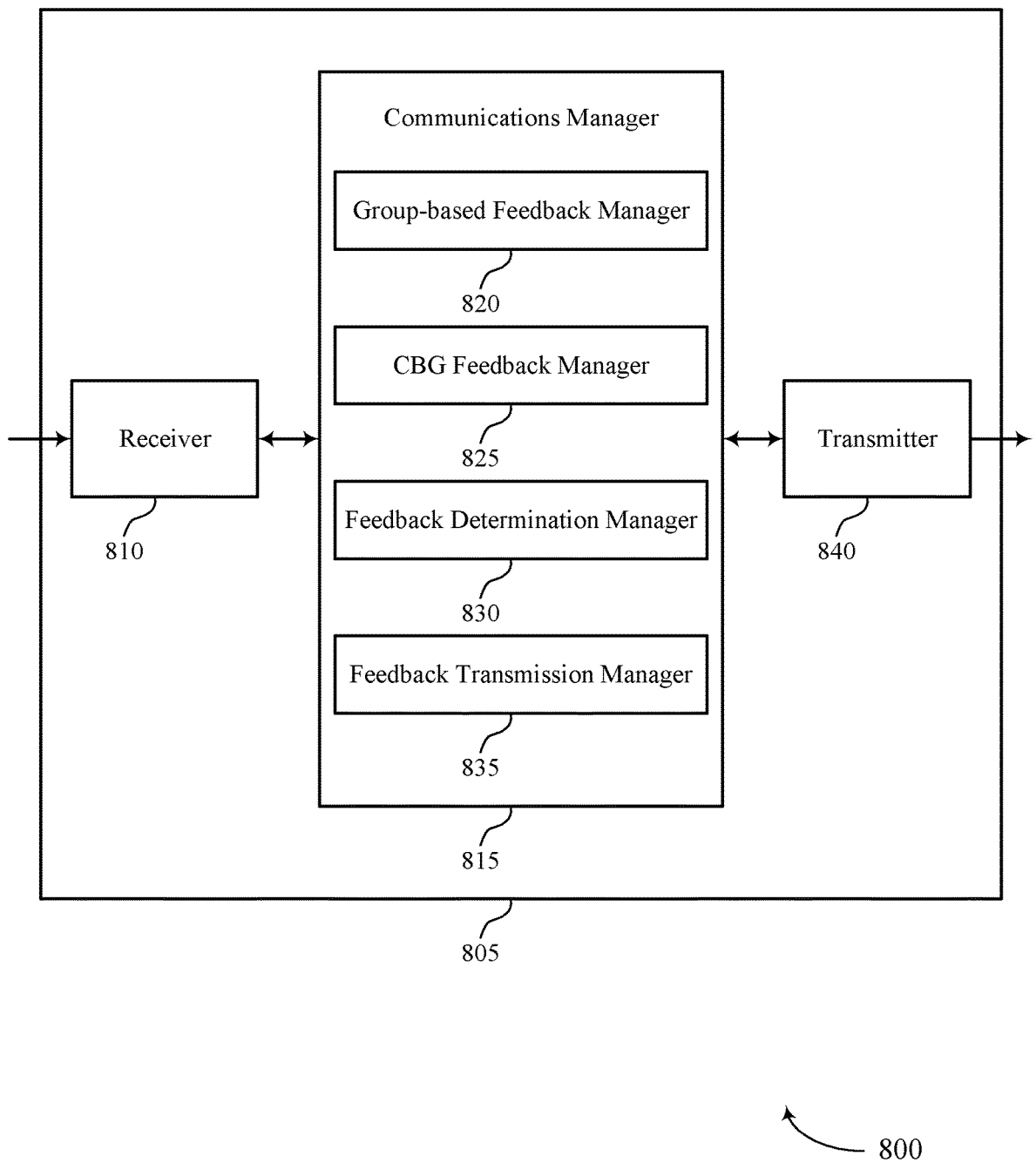

FIGS. 7 and 8 show block diagrams of devices that support CBG acknowledgment feedback techniques in wireless communications in accordance with aspects of the present disclosure.

Figure 9:
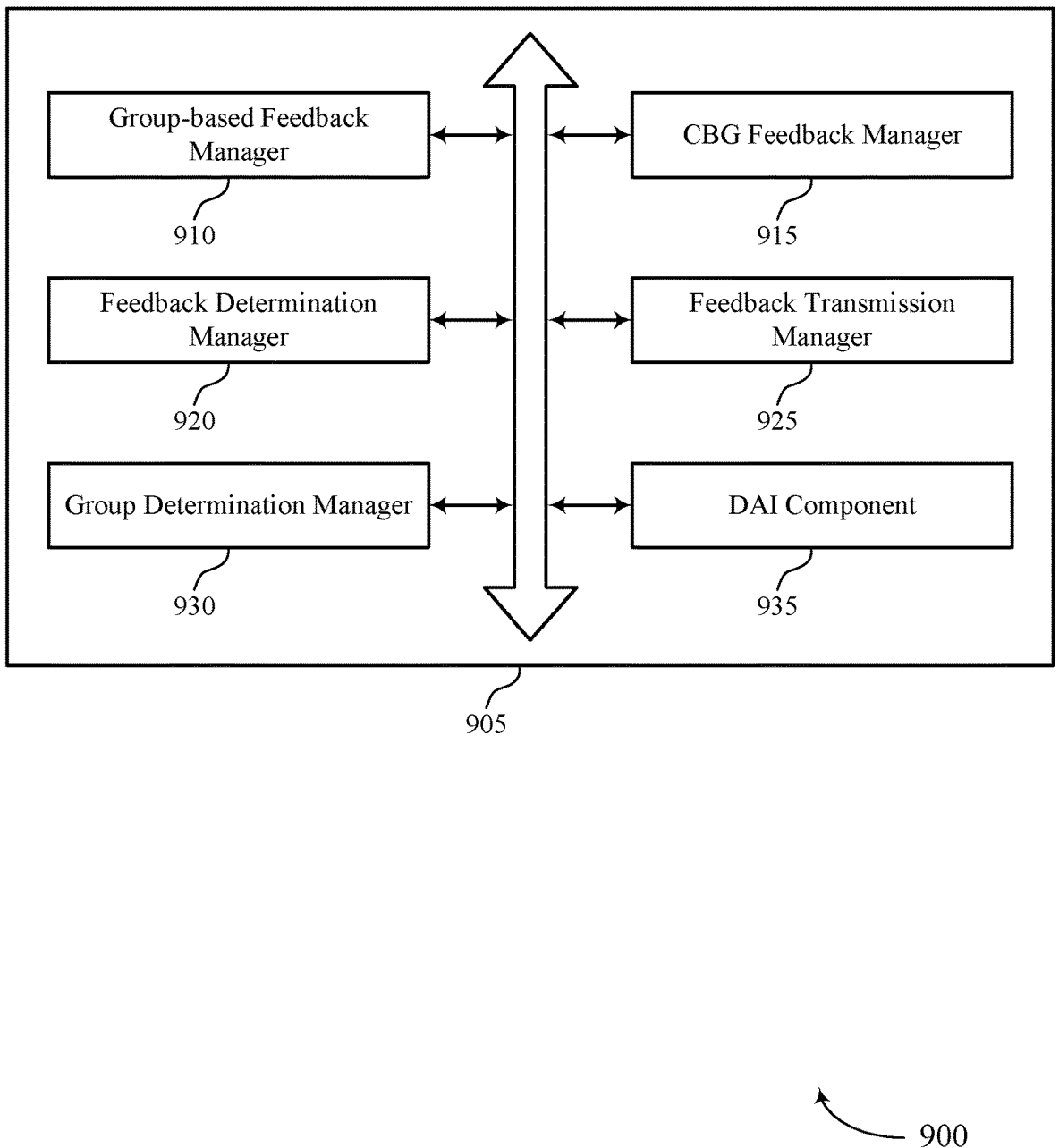

FIG. 9 shows a block diagram of a communications manager that supports CBG acknowledgment feedback techniques in wireless communications in accordance with aspects of the present disclosure.

Figure 10:
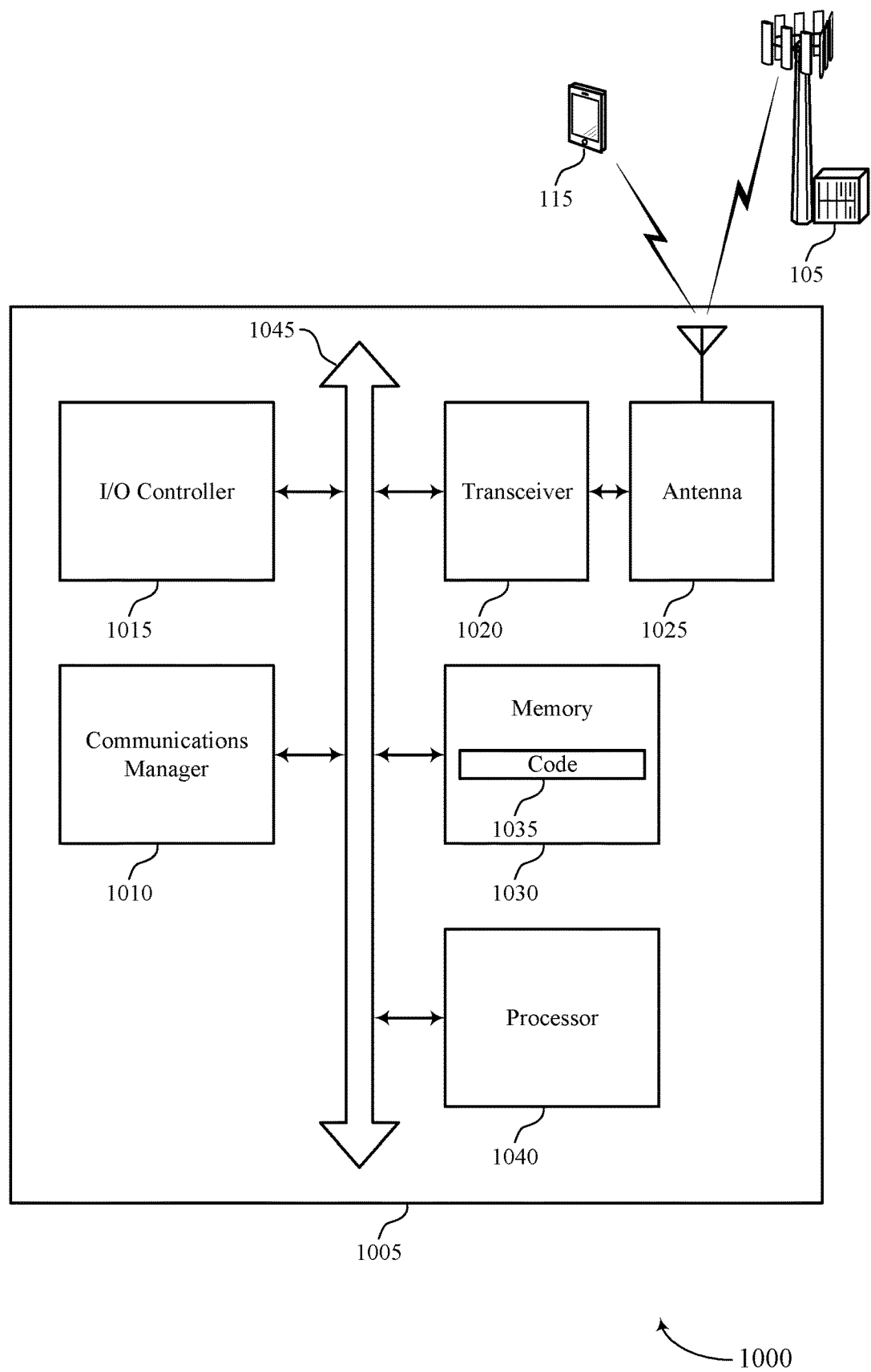

FIG. 10 shows a diagram of a system including a device that supports CBG acknowledgment feedback techniques in wireless communications in accordance with aspects of the present disclosure.

Figure 11:
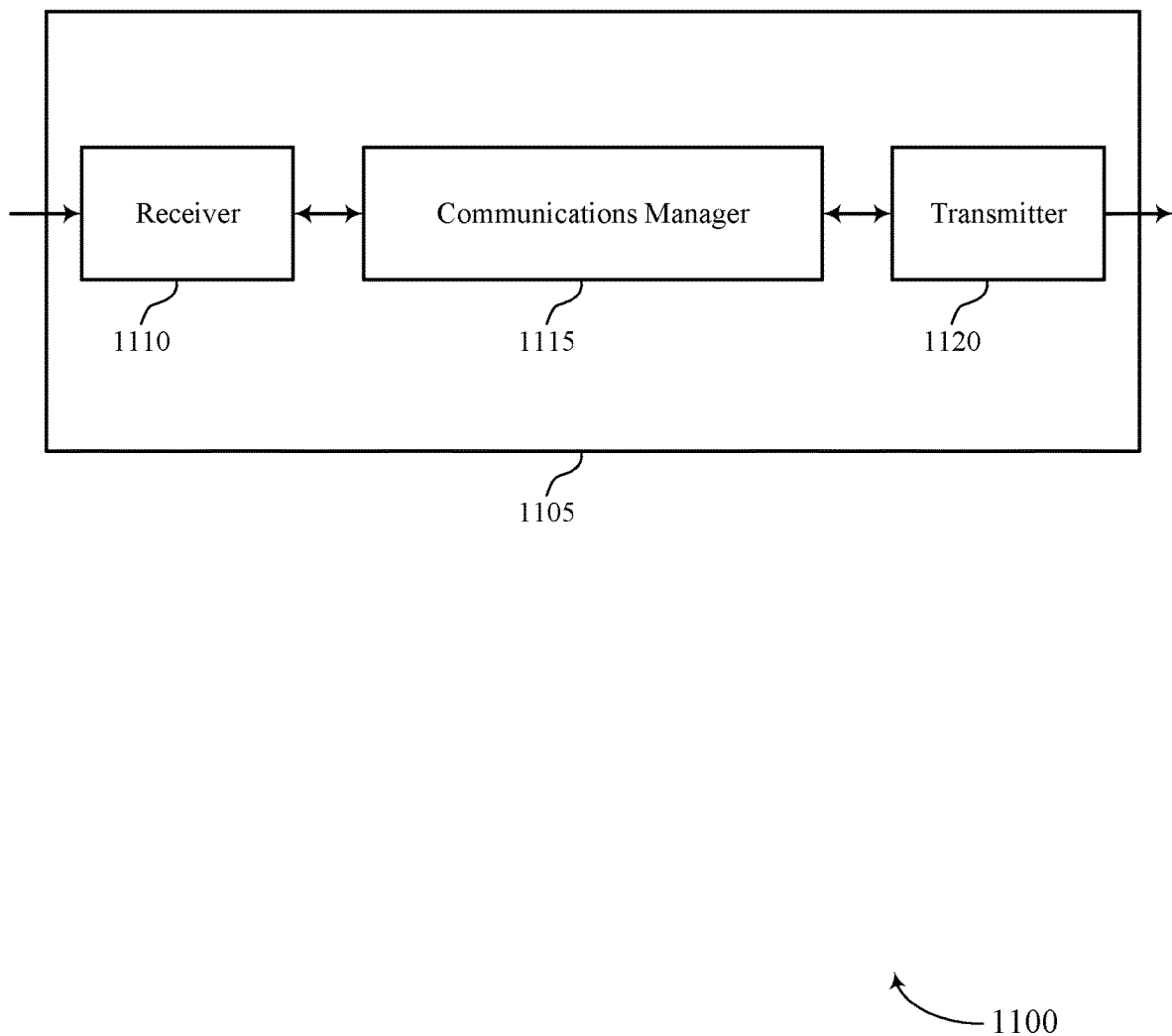
Figure 12:
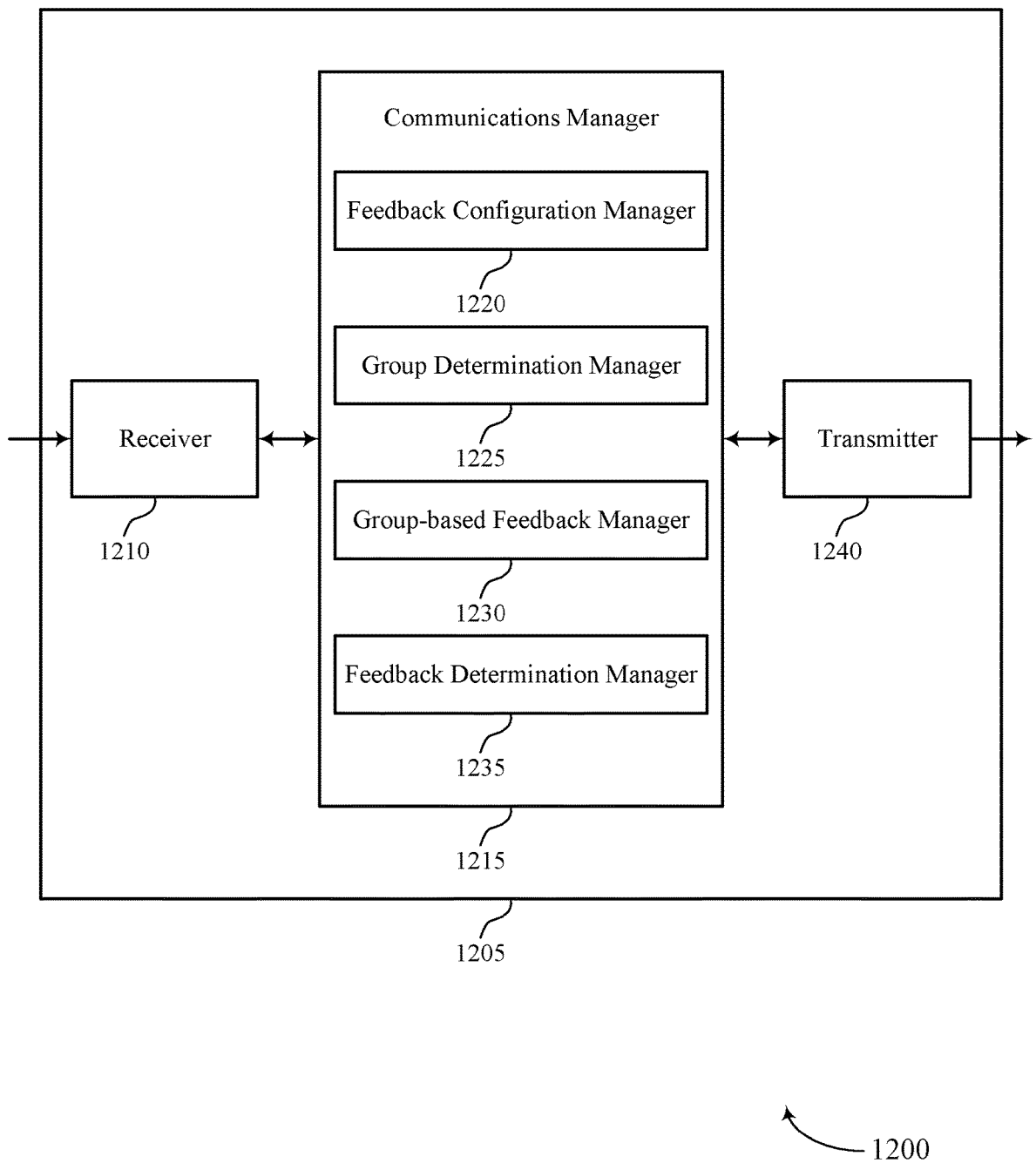

FIGS. 11 and 12 show block diagrams of devices that support CBG acknowledgment feedback techniques in wireless communications in accordance with aspects of the present disclosure.

Figure 13:
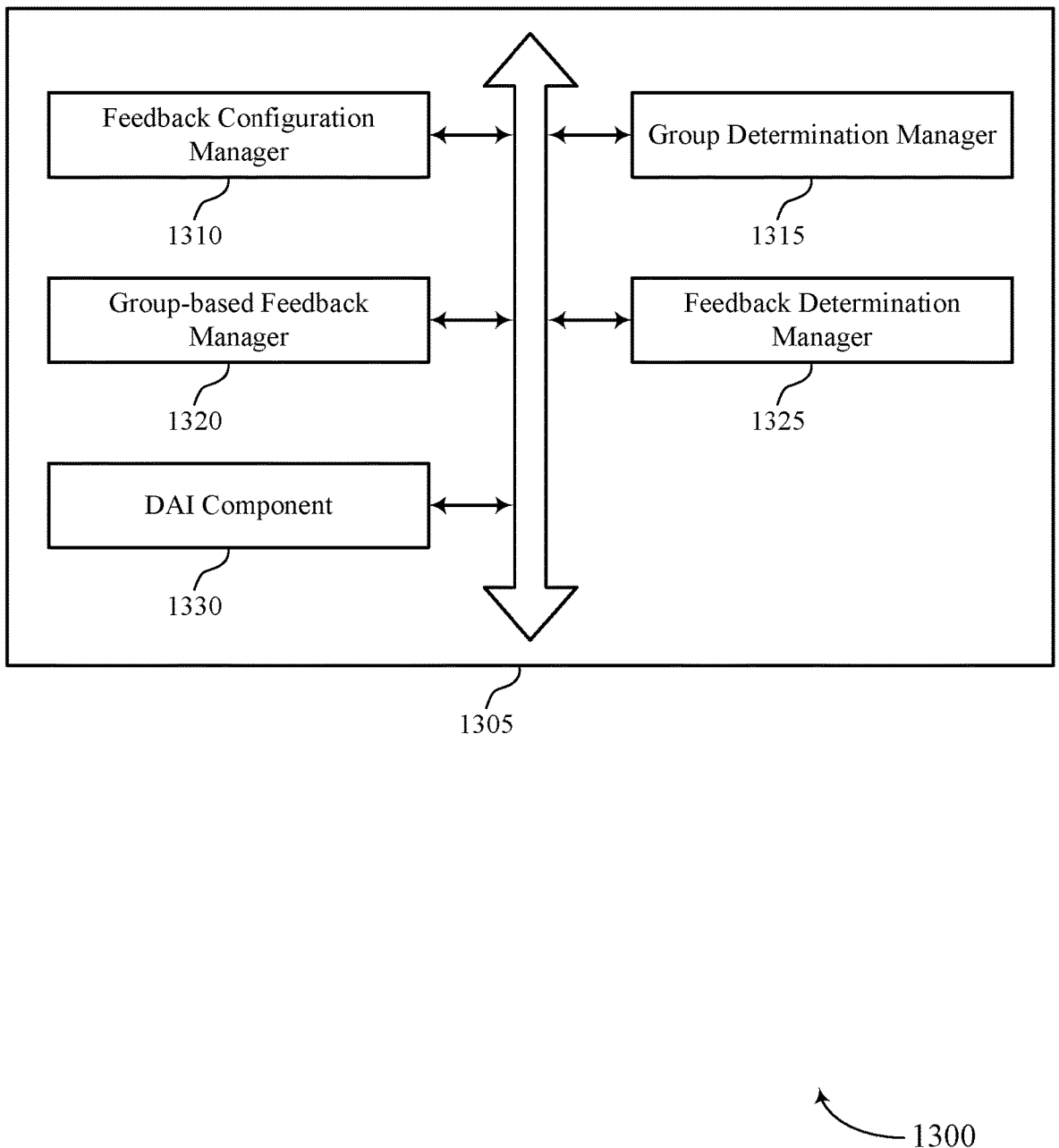

FIG. 13 shows a block diagram of a communications manager that supports CBG acknowledgment feedback techniques in wireless communications in accordance with aspects of the present disclosure.

Figure 14:
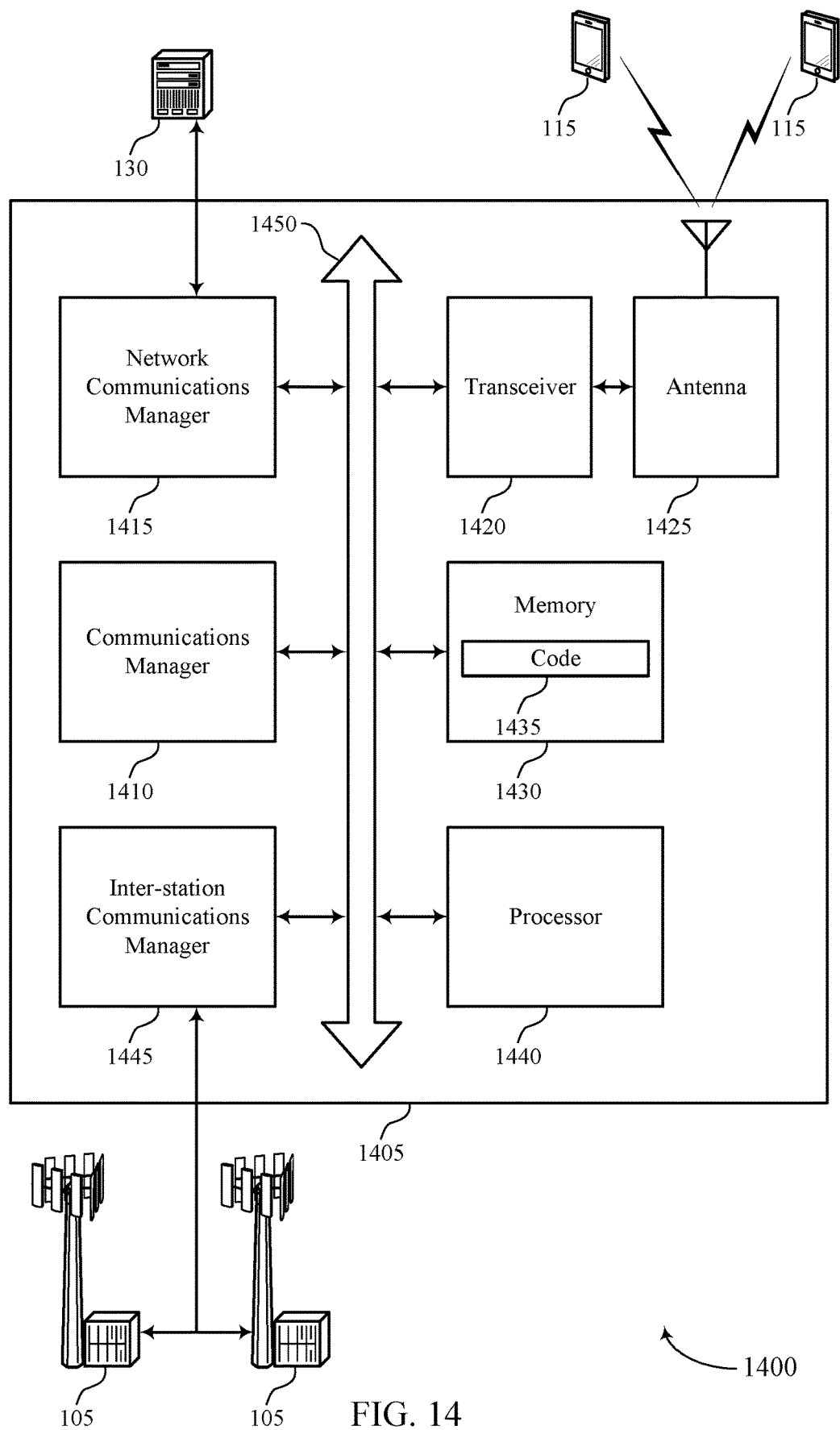

FIG. 14 shows a diagram of a system including a device that supports CBG acknowledgment feedback techniques in wireless communications in accordance with aspects of the present disclosure.

FIGS. 15 through 18 show flowcharts illustrating methods that support CBG acknowledgment feedback techniques in wireless communications in accordance with aspects of the present disclosure.

DETAILED DESCRIPTION

The described aspects of the disclosure relate to improved methods, systems, devices, or apparatuses that facilitate feedback for transmissions or retransmissions, such as hybrid automatic repeat request (HARQ) acknowledgment/negative-acknowledgment (ACK/NACK) feedback reports. In some examples, the techniques described herein enable efficient group-based feedback reporting of code block group (CBG) based feedback, transport block (TB) based feedback, or both, for one or more groups of downlink transmissions. In some cases, the one or more groups of downlink transmissions each may include multiple downlink transmissions, and feedback for the different downlink transmissions may be provided by a user equipment (UE) to a base station in a feedback codebook transmitted in an uplink communication.

In some cases, two or more different groups of downlink transmissions may each have an associated group-based acknowledgment feedback that is at a CBG or TB level. In some cases, a base station may transmit DCI to a UE that indicates one or more parameters that are used to determine which downlink transmissions are to be reported in the group-based feedback, and whether CBG or TB level feedback is to be provided. Based on the parameters in the DCI, the UE may determine the feedback to be reported, whether the feedback is to be provided at the CBG and/or TB level, and a timing for when to transmit the feedback to the base station. In some further aspects of the present disclosure, techniques are provided in which an uplink DCI that includes information for an uplink transmission that is to include group-based acknowledgment feedback may also provide downlink assignment indicator or index (DAI) values for one or more of the groups of downlink transmissions. A UE may determine the feedback codebook for providing the acknowledgment feedback based at least in part on the DAI provided in the uplink DCI.

In some cases, a UE may be configured for handling CBG level feedback based on one or more rules. In some cases, the UE may be preconfigured for handling of feedback at the TB level or CBG level. In some cases, the UE may be configured as part of a connection establishment of connection reestablishment procedure (e.g., via radio resource control (RRC) signaling) performed with the base station. In some cases, CBG level acknowledgement feedback may not be allowed when the UE is configured for group-based acknowledgement feedback. In other cases, CBG level acknowledgment feedback may be allowed when the UE is configured for group-based acknowledgment feedback only when a number of downlink transmission groups is configured to be one (i.e., group feedback may be provided at the CBG level only when a single downlink transmission group is configured). In other cases, CBG level acknowledgment feedback may be allowed when the UE is configured for group-based acknowledgment feedback with multiple groups of downlink transmissions, and CBG level feedback may be requested only in one of the downlink transmission groups (e.g., CBG level feedback may only be requested in group index 1 indicated in the DCI), and TB level feedback may be used for other of the downlink transmission groups (e.g., in group index 0 and any other configured downlink transmission groups other than group index 1). In further cases, CBG level acknowledgment feedback may be allowed when the UE is configured for group-based acknowledgment feedback with multiple groups of downlink transmissions, and CBG level or TB level feedback may be requested in one of the downlink transmission groups (e.g., a second group), and TB level feedback may be used for other of the downlink transmission groups. In still further cases, CBG level acknowledgment feedback may be allowed when the UE is configured for group-based acknowledgment feedback with multiple groups of downlink transmissions, and CBG level or TB level feedback, or both, may be requested for any one or more of the multiple groups of downlink transmissions.

In some aspects of the disclosure, a base station may schedule a UE to transmit acknowledgement feedback reports in uplink transmissions in which the feedback reports are multiplexed with uplink data transmitted by the UE (e.g., on a physical uplink shared channel (PUSCH)). In some cases, the base station may provide DCI for the uplink transmission (referred to as uplink DCI) that includes uplink scheduling information and one or more parameters associated with the acknowledgment feedback report, such as DAI information, that may be used to determine acknowledgment feedback to be reported by the UE. In some cases, separate uplink total DAI fields may be separately indicated in the uplink DCI for each sub-codebook to be provided in the acknowledgment feedback report, irrespective of whether different sub-codebooks are a results of CBG based or TB based feedback. In other cases, uplink DCI may provide separate uplink total DAI fields only for CBG based feedback or TB based feedback for each downlink transmission group, and not for different codebooks for different downlink transmission groups.

Aspects of the disclosure are initially described in the context of a wireless communications system. Additional aspects of the disclosure are then described with respect to several techniques for group-based acknowledgment feedback. Aspects of the disclosure are further illustrated by and described with reference to apparatus diagrams, system diagrams, and flowcharts that relate to CBG acknowledgment feedback techniques in wireless communications.

Figure 1:
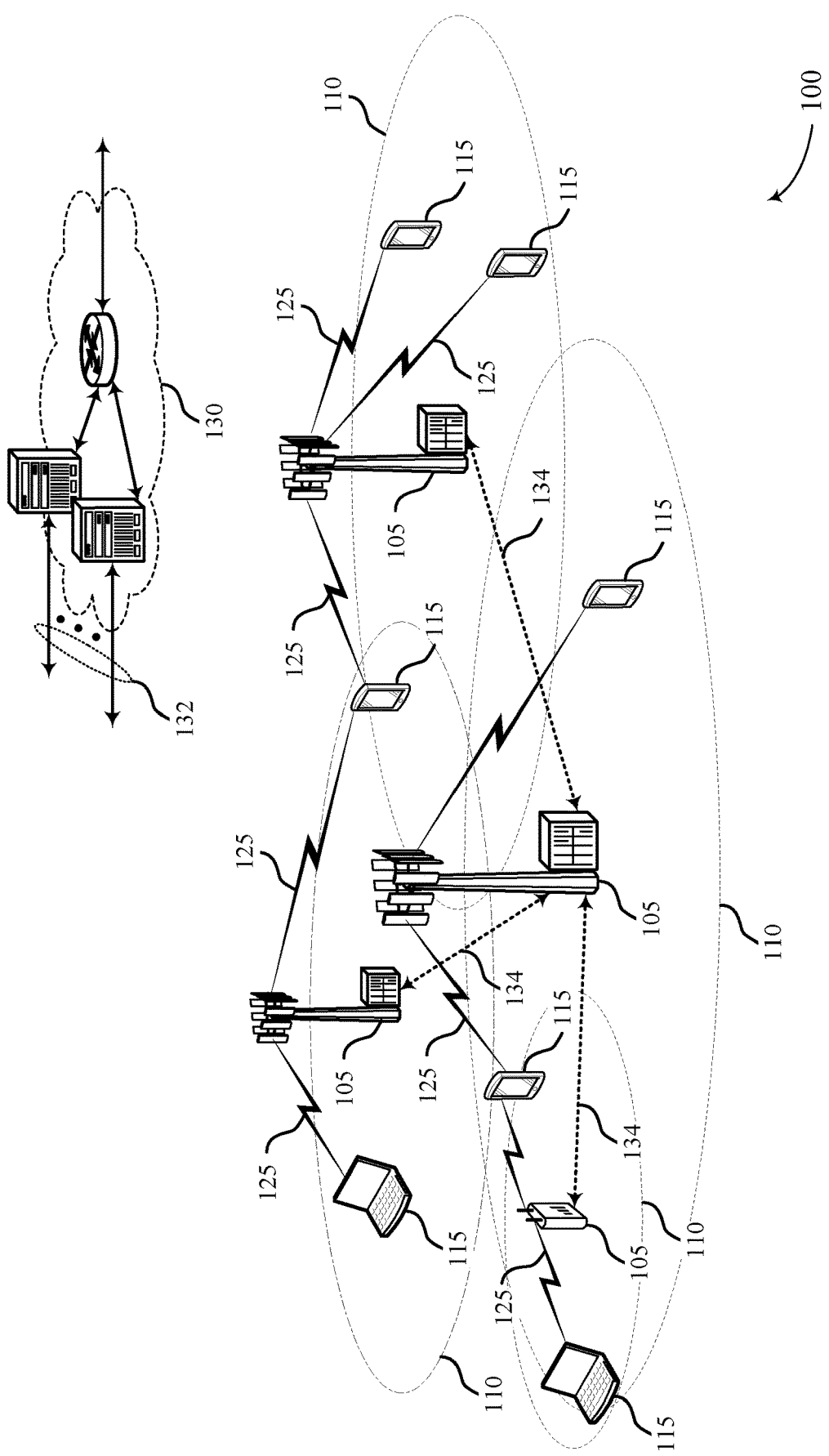
FIG. 1 illustrates an example of a system for wireless communications that supports code-block-group (CBG)

FIG. 1 illustrates an example of a wireless communications system 100 that supports CBG acknowledgment feedback techniques in wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, UEs 115 and base stations 105 may support retransmissions of data to increase the likelihood that data is received successfully. HARQ feedback such as discussed herein is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support group-based acknowledgment feedback in which HARQ feedback for one or more groups of downlink transmissions may be transmitted from a UE 115 to a base station 105 in a single uplink communication. Various techniques described herein enable efficient group-based acknowledgment feedback reporting, in which feedback for a number of different downlink transmissions may be provided by a UE 115 to a base station 105, using TB level feedback, CBG level feedback, or combinations thereof.

FIG. 2 illustrates an example of a wireless communications system 200 that supports CBG acknowledgment feedback techniques in wireless communications in accordance with aspects of the present disclosure. In some examples, wireless communications system 200 may implement aspects of wireless communications system 100. Wireless communications system 200 may include a base station 105-a and a UE 115-a, which may be examples of corresponding base stations 105 and UEs 115 as described with reference to FIG. 1.

As described herein, base station 105-a and UE 115-a may employ HARQ feedback techniques to indicate whether data has been received correctly at UE 115-a. For example, base station 105-a may transmit one or more downlink messages to UE 115-a on resources of a carrier 205. Accordingly, UE 115-a may transmit an indication of whether the one or more downlink messages were received and decoded correctly on resources of a carrier 210. In some cases, carriers 205 and 210 may be the same carrier. In some cases, carriers 205 and 210 may be component carriers (CCs), and a number of different CCs may be used for communications between the UE 115-a and the base station 105-a. In some cases, carriers 205 and 210 may use licensed spectrum, shared or unlicensed spectrum, or combinations thereof. When using unlicensed or shared spectrum, the UE 115-a and base station 105-a may use a contention-based access technique (e.g., a listen-before-talk (LBT) procedure) to determine if a channel is available prior to initiating transmissions.

In this example, base station 105-a may transmit a group-based feedback DCI 215 on carrier 205, and UE 115-a responds with CBG/TB based feedback report 220 on carrier 210. The group-based feedback DCI 215 may be included in a downlink or uplink grant (e.g., downlink message such as a physical downlink control channel (PDCCH) transmission), or UE 115-a may be explicitly triggered to transmit CBG/TB based feedback report 220 (e.g., in a separate DCI message). When group-based feedback DCI 215 is present, UE 115-a may be indicated, by base station 105-a, to provide the CBG/TB based feedback report 220 based on one or more group-based feedback parameters at a TB level, CBG level, or combinations thereof. For example, the base station 105-a may configure the UE 115-a for group-based feedback, and the UE 115-a may prepare and transmit CBG/TB based feedback report 220 based on the group-based feedback configuration.

In some cases, the wireless communications system 200 may operate in a NR system, which may allow for two modes of transmission of a HARQ-ACK codebook, which may include a semi-static (e.g., Type 1) mode and a dynamic (e.g., Type 2) mode. A dynamic feedback mode may allow for grouping of multiple downlink transmissions (e.g., physical downlink shared channel (PDSCH) grouping for one or more PDSCH groups) by signaling feedback parameters that provide a group identification (e.g., a group index may be provided in a DCI scheduling a PDSCH transmission). In some cases, such feedback parameters may include an indication of an uplink transmission timing (e.g., based on a value of K1, which is a PDSCH-to-HARQ_feedback timing indicator field in the DCI), that indicates a number of slots between a downlink transmission and a slot that is to include the CBG/TB based feedback report 220. In some cases, a non-numerical value of uplink transmission timing (e.g., a non-numeric K1) that may indicate that the CBG/TB based feedback report 220 is to be transmitted responsive to a trigger event (e.g., a trigger from the base station 105-*a* that provides timing information for an uplink transmission with the acknowledgment feedback report). In cases of numeric or non-numeric uplink transmission timing, a number of feedback bits (e.g., HARQ ACK/NACK indications for downlink TBs/CBGs) can change between successive requests for acknowledgment feedback for the same downlink transmission group. In some cases, the CBG/TB based feedback report 220 may carry feedback in a same uplink transmission (e.g., a same physical uplink control channel (PUCCH) transmission) for each of a number of different downlink transmissions in a downlink transmission group. Further, in some cases, a single group-based feedback DCI 215 may request acknowledgment feedback for one or more downlink transmission groups in a same CBG/TB based feedback report 220.

In some cases, the group-based feedback DCI 215 may include an indication of one or more DAIs that may provide a counter of downlink assignments (e.g., TB or CBG downlink transmissions) that are to be reported in a CBG/TB based feedback report 220. In some cases, the DAIs may include a counter DAI (cDAI) that may indicate an accumulated number of downlink transmissions (e.g., number of TBs, from which a number of CBs may be determined based on a configured number of CBGs in each TB (e.g., 4 CBGs in each TB)) within each downlink transmission group. In some cases, the cDAI may count up using a modulo four operation (i.e., the cDAI value may be provided using two bits, in which the UE 115-*a* and base station 105-*a* may determine the cDAI based on whether the bits have rolled-over due to the modulo operation). In some cases, the DAIs may also include a total DAI (tDAI), that may indicate a total number of DAIs across multiple component carriers or downlink transmission groups, which may also use a modulo operation as discussed with the cDAI. The tDAI may thus provide an indication of whether the UE 115-*a* may have missed a DCI for a carrier. In some cases, the tDAI may be provided only for the scheduled downlink transmission group. In other cases, the tDAI may be provided for each downlink transmission group irrespective of whether the DCI has scheduling information for a group. In some cases, the feedback parameters may also include a new acknowledgment feedback indicator (NFI) for each downlink transmission group which may operate as a toggle bit that, when toggled, indicates the DAI for the downlink transmission group is to be reset. In some cases, the UE 115-*a* may provide a capability report to the base station 105-*a* that indicates a capability of the UE to support group-based acknowledgment feedback.

In some cases, UE 115-*a* may be configured to provide CBG based acknowledgment feedback based on an RRC configuration (e.g., through RRC parameter PDSCH-CodeBlockGroupTransmission) for one or more downlink serving cells (e.g., downlink CCs), and the reported feedback codebook may include two sub-codebooks. In such cases, the cDAI value and the tDAI value apply separately for each sub-codebook. A sub-codebook may be provided for all downlink serving cells when CBG based acknowledgment feedback is not needed, and ACK/NACK bits are generated per TB. In such cases, for each (cDAI, tDAI) location in the sub-codebook, one ACK/NACK bit may be used (unless maxNrofCodeWordsScheduledByDCI is 2 for at least one CC in which case 2 bits may be used). The second sub-codebook may be provided for downlink serving cells that are configured with CBG-based acknowledgment feedback, which a maximum number of CBGs is used across those CCs and ACK/NACK bits generated per CBG. In such cases, for each (cDAI, tDAI) location in the sub-codebook, the maximum CBG number of ACK/NACK bits may be reported (e.g., four CBGs per TB).

When providing the CBG/TB based feedback report 220, the UE 115-*a* may determine the one or more feedback codebook/sub-codebooks that are reported to the base station 105-*a* to indicate ACK/NACK for each associated downlink transmission (e.g., for each scheduled TB/CBG). In some cases, the codebook may be determined based on PDCCH monitoring occasions (e.g., based on configuration of different search space (SS) sets in different serving cells, as a union of PDCCH monitoring occasions across active downlink bandwidth parts (BWPs) of configured serving cells, ordered in ascending order of start time of the SS set associated with a PDCCH monitoring occasion). If two SS sets (of the same or different serving cells) have the same start time, it is counted as one PDCCH monitoring occasion. The feedback codebook may also be determined based on the DAIs that are received via DCI transmissions where, if a DCI is not missed, one or more ACK/NACK bit(s) corresponding to the received PDSCH is placed in the codebook in the same order as cDAI. If a DCI is missed, one or more NACKs are placed in the codebook in the same order as the missed cDAI. In some cases, the UE 115-*a* may determine if a DCI is missed by comparing consecutive cDAI values (e.g., consecutive cDAI values of 0, 1, 3 means that a DCI with cDAI value of 2 is missed). In cases where tDAI is transmitted, the UE 115-*a* may determine if a DCI is missed by comparing tDAI with cDAI of all DCIs in the same PDCCH monitoring occasion (e.g., for two serving cells in a given PDCCH monitoring occasion, if only one DCI with (cDAI,tDAI)=(1,2) is received, this means that the second DCI is missed). As indicated, the UE 115-*a* may insert NACK(s) in the CBG/TB based feedback report 220 for each missed DCI according to an order of the DAIs (e.g., insert one NACK associated with each missed TB, or one or more NACKs associated with each code-block of a missed TB).

As will be discussed in more detail with reference to FIGS. 3 through 6, in various examples different techniques may provide for CBG and TB based acknowledgment feedback reporting for multiple downlink transmission groups. The CBG/TB based feedback report 220 may include group-based acknowledgment feedback in accordance with various discussed techniques for one or more groups of downlink transmissions based on the group-based feedback parameters. In cases where feedback is provided for two or more groups of downlink transmissions, feedback information may be multiplexed together in a single CBG/TB based feedback report 220 in an uplink communication from the UE 115-*a* to the base station 105-*a*.

Figure 3:
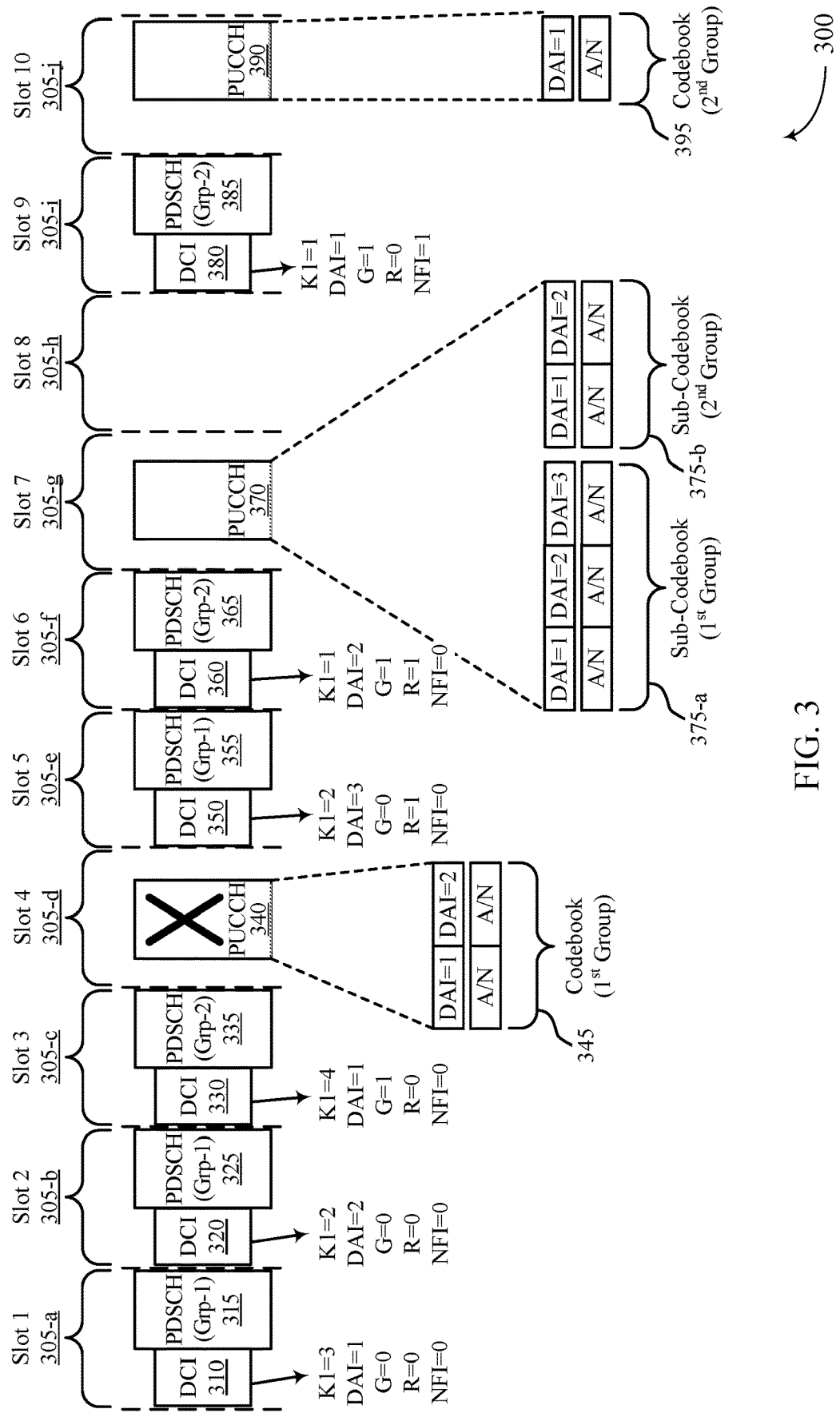

FIG. 3 illustrates an example of a feedback timeline 300 for TB level acknowledgment feedback in wireless communications in accordance with aspects of the present disclosure. In some examples, feedback timeline 300 may implement aspects of wireless communications system 100 or 200. In this example, a number of transmission slots 405 are illustrated, including a first transmission slot 305-*a* through a tenth transmission slot 305-*j*. In some cases, transmissions using transmission slots 305 may use licensed spectrum, unlicensed spectrum, or combinations thereof.

In this example, a first DCI 310 may be transmitted in the first slot 305-*a*, that may include downlink scheduling information for an associated first PDSCH transmission 315 of a first group in the first slot 305-*a*. In this example, the first DCI 310 may include TB level group-based feedback parameters, K1=3 (i.e., that indicates the associated acknowledgment feedback is to be provided in fourth slot 305-*d*, as discussed with respect to FIG. 2), DAI=1 (i.e., that indicates the DAI is for an initial acknowledgment feedback indicator to be included in an acknowledgment codebook), G=0 (i.e., that identifies first downlink transmission group), R=0 (i.e., a feedback report is requested for only the same group that is associated with the DCI), and NFI=0. In this example, the DAI may indicate TBs for associated TB level feedback. In other cases, such as discussed with respect to FIG. 4, one or more downlink transmission groups may be configured for CBG level feedback, in which case a maximum number of configured CBGs per TB may be used for determination of ACK/NACK bits.

In the example of FIG. 3, a second DCI 320 may schedule a second PDSCH transmission 325 of the first downlink transmission group in second slot 305-*b*. In this example, the second DCI 320 includes group-based feedback parameters of K1=2 (i.e., that the associated acknowledgment feedback is to be provided in the fourth slot 305-*d*), DAI=2 (i.e., the next consecutive DAI count indicating that one or more DAIs have not been missed), G=0 (i.e., for the same group as the first DCI 310 and first PDSCH transmission 315), R=0 (i.e., that feedback for another group is not requested), and NFI=0 (i.e., that the DAI has not been reset based on not being toggled from the prior DCI).

In this example a third slot 305-*c* may include a third DCI 330 associated with a third PDSCH transmission 335 of a second downlink transmission group. In this example, the third DCI 330 includes TB level group-based feedback parameters of K1=4 (i.e., that the associated acknowledgment feedback is to be provided in the seventh slot 305-*g*), DAI=1 (i.e., an initial DAI for the second group), G=1 (i.e., for the second group, which is different than the group of the first DCI 310 and second DCI 320, R=0 (i.e., that feedback for another group is not requested), and NFI=0.

The UE receiving the downlink transmissions may format a feedback codebook 345 for transmission in PUCCH transmission 340 that, in this example, includes bits associated with each TB indicated in DAI of the first group of downlink transmissions as indicated in the received feedback parameters. Thus, in this example, feedback codebook 345 is for the first group, and includes a TB level ACK/NACK bit associated with DAI=1 of the first slot 305-*a*, and a second TB level ACK/NACK bit associated with DAI=2 of the second slot 305-*b*. In this example, the PUCCH transmission 340 may not be successfully received at the base station (e.g., due to interference, failed LBT, etc.).

In this example, the base station may determine that the PUCCH transmission 340 is not successfully received, and may thus maintain DCI parameters of the first and second groups for group-based acknowledgment feedback in order to obtain the feedback associated with the first slot 305-*a* through the third slot 305-*c*. In this example in fifth slot 305-*e*, associated with the first downlink transmission group, the base station may transmit a fourth DCI 350 for an associated fourth PDSCH transmission 355. In this example, the fourth DCI 350 includes TB level group-based feedback parameters of K1=2 (i.e., that the associated acknowledgment feedback is to be provided in the seventh slot 305-*g*), DAI=3 (i.e., the next consecutive DAI count indicating that one or more DAIs have not been missed), G=0 (i.e., for the same group as the first DCI 310 and first PDSCH transmission 315), R=1 (i.e., that feedback for both the first group and the second group is requested), and NFI=0 (i.e., that the DAI has not been reset based on not being toggled from the prior DCI).

In this example, in sixth slot 305-*f*, associated with the second group of downlink transmissions, the base station may transmit a fifth DCI 360 for an associated fifth PDSCH transmission 365. In this example, the fifth DCI 360 includes TB level group-based feedback parameters of K1=1 (i.e., that the associated acknowledgment feedback is to be provided in the seventh slot 305-*g*), DAI=2 (i.e., the next consecutive DAI count of the second group indicating that one or more DAIs have not been missed), G=1 (i.e., for the second downlink transmission group), R=1 (i.e., that feedback for both the first group and the second group is requested), and NFI=0 (i.e., that the DAI has not been reset based on not being toggled from the prior DCI).

The seventh slot 305-*g* may include resources for a second PUCCH transmission 370, for reporting of the group-based acknowledgment feedback. In this case, the UE may again determine feedback, which in this case includes TB level feedback for both the first group and the second group of downlink transmissions. In this example, the UE may format a first sub-codebook 375-*a* for the first group (i.e., for PDSCH transmissions 315, 325, and 355), and format a second sub-codebook 375-*b* for the second group (i.e., for PDSCH transmissions 335, and 365). Each sub-codebook 375 includes bits associated with each DAI indicated in the received DAI fields for the associated group. Thus, in this example, first sub-codebook 375-*a* includes an ACK/NACK bit associated with first group DAI=1 of the first slot 305-*a*, a second ACK/NACK bit associated with first group DAI=2 of the second slot 305-*b*, and a third ACK/NACK bit associated with first group DAI=3 of the fifth slot 305-*e*. Further, the second sub-codebook 375-*b* includes an ACK/NACK bit associated with second group DAI=1 of the third slot 305-*c*, and a second ACK/NACK bit associated with second group DAI=2 of the sixth slot 305-*f*.

In this example, the second PUCCH transmission 370 may be successfully received, and the base station may toggle the NFI field for both groups and reset the associated DAI for each group. In this example, a sixth DCI 380 and sixth PDSCH transmission 385 associated with the second group may be transmitted in ninth slot 305-*i*. The sixth DCI 380 may include TB level feedback parameters K1=1, DAI=1, G=1, R=0, and NFI=1, which may indicate to the UE to transmit third PUCCH transmission 390 with an acknowledgment feedback report having codebook 395 for the second group only, with a single ACK/NACK associated with the sixth PDSCH transmission 385.

As discussed herein, in some cases one or more of the downlink transmission groups may be configured for CBG level feedback. In some cases, CBG level feedback may be provided only when a number of downlink transmission groups is equal to one (e.g., transmissions of the second group in the third slot 305-*c*, sixth slot 305-*f* and ninth slot 305-*i* would be for group 1, if present). In such cases, the codebooks 345 or 375 may include ACK/NACK bits for each CBG associated with a DAI, and two sub-codebooks may be used, one for TB level feedback and another for CBG level feedback. In such cases, cDAI, tDAI, as well as NFI toggling apply separately for the two sub-codebooks. In other cases, multiple downlink transmission groups may be configured and one or more may use CBG level feedback. Various examples of timelines for providing CBG level feedback are discussed with respect to the examples of FIGS. 4 through 6.

Figure 4:
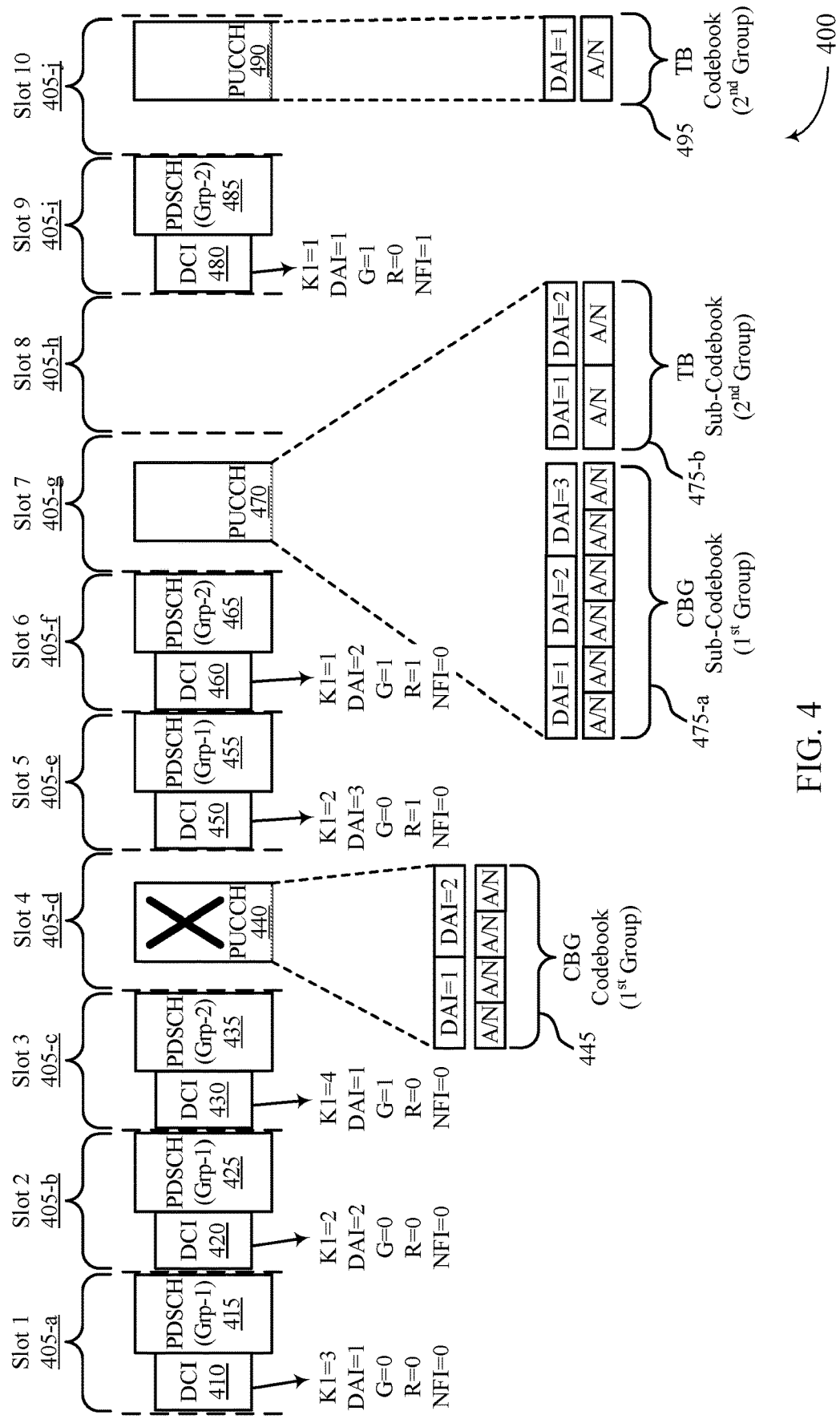

FIG. 4 illustrates an example of a feedback timeline 400 that supports CBG acknowledgment feedback techniques in wireless communications in accordance with aspects of the present disclosure. In some examples, feedback timeline 400 may implement aspects of wireless communications system 100 or 200. In this example, a number of transmission slots 405 are illustrated, including a first transmission slot 405-*a* through a tenth transmission slot 405-*j*, similarly as discussed with respect to FIG. 3. In some cases, transmissions using transmission slots 405 may use licensed spectrum, unlicensed spectrum, or combinations thereof.

In this example, a first DCI 410 may be transmitted in the first slot 405-*a*, that may include downlink scheduling information for an associated first PDSCH transmission 415 of a first group in the first slot 405-*a*. In this example, the first DCI 410 may include CBG level group-based feedback parameters, K1=3 (i.e., that indicates the associated acknowledgment feedback is to be provided in fourth slot 405-*d*, as discussed with respect to FIG. 2), DAI=1 (i.e., that indicates the DAI is for an initial acknowledgment feedback indicator to be included in an acknowledgment codebook), G=0 (i.e., that identifies first downlink transmission group), R=0 (i.e., a feedback report is requested for only the same group that is associated with the DCI), and NFI=0. In some cases, the first DCI 410 may provide an explicit indication that CBG level acknowledgment feedback is to be provided (e.g., in a TB/CBG indication field). In other cases, the UE may be configured to identify that a certain group index is associated with CBG or TB level feedback. In this example, the DAI may indicate TBs for the CBG level feedback, and a maximum number of configured CBGs per TB (e.g., a maximum of two CBGs per TB, in this example, although other examples may have more CBGs per TB) may be used for determination if ACK/NACK bits.

In the example of FIG. 4, a second DCI 420 may schedule a second PDSCH transmission 425 of the first downlink transmission group in second slot 405-*b*. In this example, the second DCI 420 includes CBG level group-based feedback parameters of K1=2 (i.e., that the associated acknowledgment feedback is to be provided in the fourth slot 405-*d*), DAI=2 (i.e., the next consecutive DAI count indicating that one or more DAIs have not been missed), G=0 (i.e., for the same group as the first DCI 410 and first PDSCH transmission 415), R=0 (i.e., that feedback for another group is not requested), and NFI=0 (i.e., that the DAI has not been reset based on not being toggled from the prior DCI).

In this example a third slot 405-*c* may include a third DCI 430 associated with a third PDSCH transmission 435 of a second downlink transmission group. In this example, the third DCI 430 includes TB level group-based feedback parameters of K1=4 (i.e., that the associated acknowledgment feedback is to be provided in the seventh slot 405-*g*), DAI=1 (i.e., an initial DAI for the second group), G=1 (i.e., for the second group, which is different than the group of the first DCI 410 and second DCI 420, R=0 (i.e., that feedback for another group is not requested), and NFI=0.

The UE receiving the downlink transmissions may format a feedback codebook 445 for transmission in PUCCH transmission 440 that, in this example, includes bits associated with each CBG associated with the indicated DAIs of the first group of downlink transmissions as provided in the received feedback parameters. Thus, in this example, feedback codebook 445 is for the first group, and includes first CBG level ACK/NACK bits for each CBG associated with DAI=1 of the first slot 405-*a*, (i.e., two CBGs per TB, in this example) and second CBG level ACK/NACK bits associated with DAI=2 of the second slot 405-*b*. In this example, the PUCCH transmission 440 may not be successfully received at the base station (e.g., due to interference, failed LBT, etc.).

In this example, the base station may determine that the PUCCH transmission 440 is not successfully received, and may thus maintain DCI parameters of the first and second groups for group-based acknowledgment feedback in order to obtain the feedback associated with the first slot 405-*a* through the third slot 405-*c*. In this example in fifth slot 405-*e*, associated with the first downlink transmission group, the base station may transmit a fourth DCI 450 for an associated fourth PDSCH transmission 455. In this example, the fourth DCI 450 includes CBG level group-based feedback parameters of K1=2 (i.e., that the associated acknowledgment feedback is to be provided in the seventh slot 405-*g*), DAI=3 (i.e., the next consecutive DAI count indicating that one or more DAIs have not been missed), G=0 (i.e., for the same group as the first DCI 410 and first PDSCH transmission 415), R=1 (i.e., that feedback for both the first group and the second group is requested), and NFI=0 (i.e., that the DAI has not been reset based on not being toggled from the prior DCI).

In this example, in sixth slot 405-*f*, associated with the second group of downlink transmissions, the base station may transmit a fifth DCI 460 for an associated fifth PDSCH transmission 465. In this example, the fifth DCI 460 includes TB level group-based feedback parameters of K1=1 (i.e., that the associated acknowledgment feedback is to be provided in the seventh slot 405-*g*), DAI=2 (i.e., the next consecutive DAI count of the second group indicating that one or more DAIs have not been missed), G=1 (i.e., for the second downlink transmission group), R=1 (i.e., that feedback for both the first group and the second group is requested), and NFI=0 (i.e., that the DAI has not been reset based on not being toggled from the prior DCI).

The seventh slot 405-*g* may include resources for a second PUCCH transmission 470, for reporting of the group-based acknowledgment feedback. In this case, the UE may again determine feedback, which in this case includes CBG level feedback for the first group of downlink transmissions and TB level feedback the second group of downlink transmissions. In this example, the UE may format a first sub-codebook 475-*a* for the first group (i.e., for PDSCH transmissions 415, 425, and 455) that is a CBG sub-codebook with two ACK/NACK bits for each DAI of the first group of downlink transmissions, and format a second sub-codebook 475-*b* for the second group (i.e., for PDSCH transmissions 435, and 465) that is a TB sub-codebook with one ACK/NACK bit for each DAI of the second group of downlink transmissions. Each sub-codebook 475 includes bits associated with each DAI indicated in the received DAI fields for the associated group. Thus, in this example, first sub-codebook 475-*a* includes two ACK/NACK bits associated with first group DAI=1 (i.e., based on a maximum of two CBGs per TB configured for group 1) of the first slot 405-*a*, two ACK/NACK bits associated with first group DAI=2 of the second slot 405-*b*, and two ACK/NACK bits associated with first group DAI=3 of the fifth slot 405-*e*. Further, the second sub-codebook 475-*b* includes an ACK/NACK bit associated with second group DAI=1 of the third slot 405-*c*, and a second ACK/NACK bit associated with second group DAI=2 of the sixth slot 405-*f*.

In this example, the second PUCCH transmission 470 may be successfully received, and the base station may toggle the NFI field for both groups and reset the associated DAI for each group. In this example, a sixth DCI 480 and sixth PDSCH transmission 485 associated with the second group may be transmitted in ninth slot 405-*i*. The sixth DCI 480 may include TB level feedback parameters K1=1, DAI=1, G=1, R=0, and NFI=1, which may indicate to the UE to transmit third PUCCH transmission 490 with an acknowledgment feedback report having codebook 495 for the second group only, with a single ACK/NACK associated with the sixth PDSCH transmission 485.

In some cases, CBG based acknowledgment feedback can be requested only in one of the downlink transmission groups, and TB based acknowledgment feedback can be requested only in the other downlink transmission group. In such cases, in any of the downlink transmission groups, either CBG based acknowledgment or TB based acknowledgment feedback may be reported, but not both (e.g., if G=1 in DCI, TB based feedback is used, and if G=0 in DCI, CBG based feedback is used). Thus, in deployments that implement such a technique, if G=1 is used in downlink CCs (i.e., in downlink transmission groups) with CBG based acknowledgment, the UE will report TB based acknowledgment for the scheduled downlink transmission irrespective of the signaled CBG configuration for that group. Further, if G=0 is used and number of actual CBGs in the scheduled downlink transmission is smaller than the number of configured CBGs, then the UE may report NACK for the unused CBGs in the associated acknowledgment feedback. In such cases, a maximum of two sub-codebooks may be reported in a feedback (corresponding to G=0 and G=1; equivalently corresponding to TB-based and CBG-based), such as illustrated in sub-codebooks 475

In other cases, CBG based acknowledgment feedback may be requested only in one of the downlink transmission groups (e.g., in the first downlink transmission group or the second downlink transmission group). In such cases, for example, when a DCI indicates G=0 the UE may report CBG based acknowledgment for the associated scheduled downlink transmissions (e.g., if configured with CBG-based acknowledgment in a given downlink (DL) CC and DC 1_1 is used). Further, TB based acknowledgment is also possible for the first group G=0 of downlink transmissions (e.g., in DL CCs not configured with CBG-based acknowledgment). Thus, when a DCI indicates G=1 (second group), the UE does not report CBG based acknowledgment and instead reports TB based acknowledgment even if the second group is configured with CBG based acknowledgment in that downlink CC. In such cases, three sub-codebooks may be used for transmitting the acknowledgment feedback, namely one for G=1 and two for G=0, associated with three cDAI and tDAI counting processes.

In such cases, if a DCI scheduling downlink transmissions using G=1 requests feedback also for G=0 (e.g., as in fifth DCI 460), a predefined rule may be used to determine which codebook is to be used for providing acknowledgment feedback. In some examples, a first sub-codebook (TB-based) of G=0 can only be requested, and a total DAI for G=0 included in the DCI with G=1 (i.e., total DAI for the other group) is the total DAI for the first sub-codebook of G=0 (i.e., TB-based DAI of G=0). In other cases, only one of the first or second sub-codebooks of G=0 can be requested, and which one may be indicated in the DCI scheduling PDSCH with G=1 (e.g., an indication of an "other total DAI" may be included in the DCI and refer to the requested sub-codebook of G=0). In other cases, both first and second sub-codebooks of G=0 can be requested, in which case two "other total DAI" values may be provided in DCI corresponding to first and second sub-codebooks of G=0. In such cases, the acknowledgment feedback will include both TB based and CBG based feedback codebooks. In some cases, since two "other total DAI" fields are included in the DCI, if G=0 is used and associated DAI provided in the regular DAI field, the first "other total DAI" may be for G=1 (as there is only one sub-codebook for G=1) and the second "other total DAI" is for G=0 but for the other sub-codebook (i.e., if the DCI schedules downlink transmissions with CBG based acknowledgment, then the second "other total DAI" is for the TB based sub-codebook of the same group, and vice-versa). In other cases, such DCI transmissions may not include the "other total DAI" field(s), in which case the UE may use DAI reported with each separate DCI as discussed above.

In further cases, CBG based acknowledgment feedback or TB based acknowledgment feedback can be requested in either of the downlink transmission groups (G=0 or G=1). In such cases, four sub-codebooks may be provided (i.e., two for G=0 and two for G=1), and four cDAI and tDAI counting processes may be maintained. In such cases, if a DCI scheduling downlink transmissions using G=0 requests feedback also for G=1 or if a DCI scheduling downlink transmissions using G=1 requests feedback also for G=0, similar techniques as discussed above may be used to determine the sub-codebooks in which G can be 0 or 1 for requesting feedback for the other group. Further, in some cases, three "other total DAI" fields may be included in each DCI, two for the other downlink transmission group and one for the other sub-codebook of the same downlink transmission group associated with the DCI (with the fourth sub-codebook associated with the regular DAI indication of the DCI).

Figure 5:
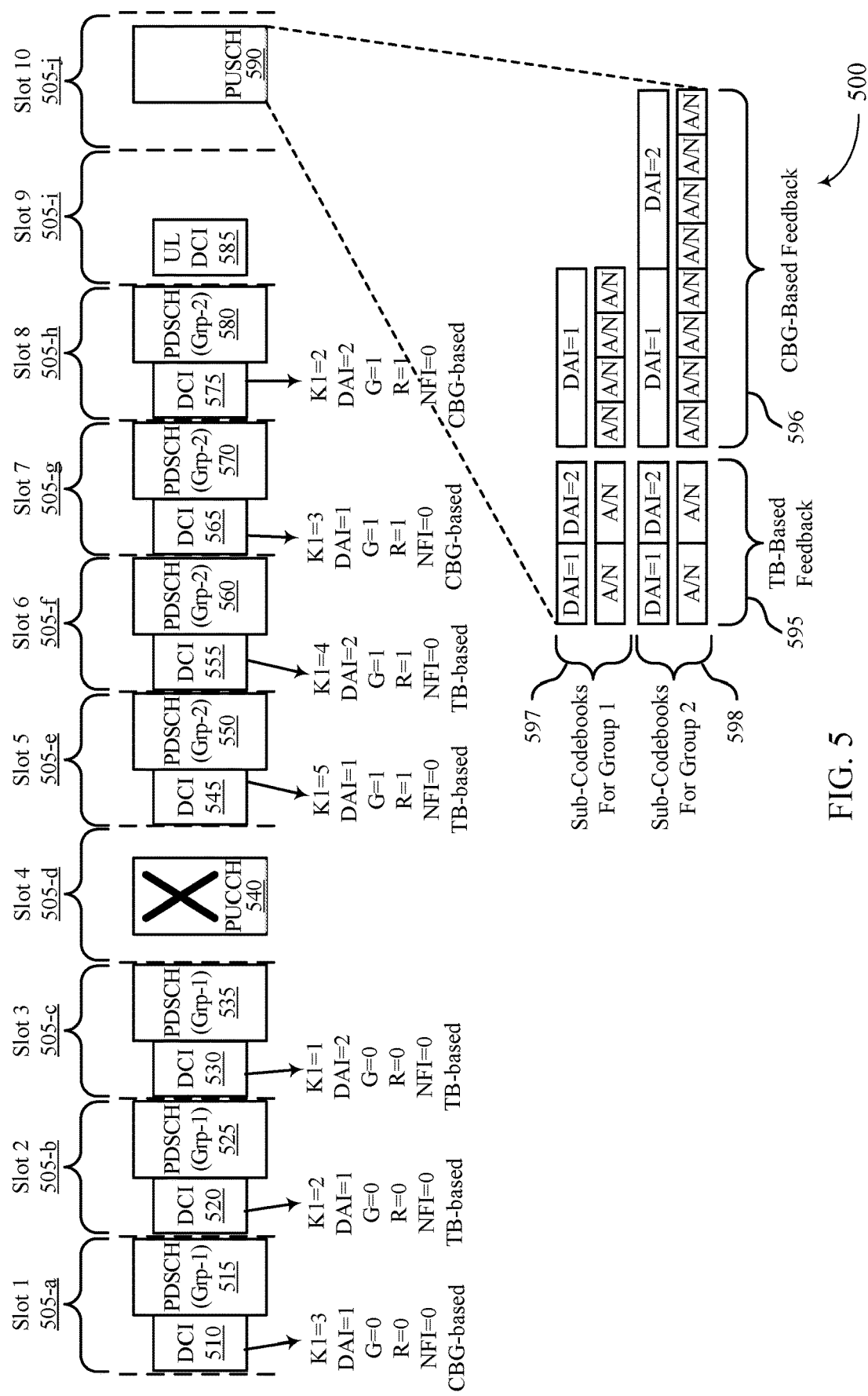

FIG. 5 illustrates another example of a feedback timeline 500 that supports CBG acknowledgment feedback techniques in wireless communications in accordance with aspects of the present disclosure. In some examples, feedback timeline 500 may implement aspects of wireless communications system 100 or 200. In this example, a number of transmission slots 505 are illustrated, including a first transmission slot 505-a through a tenth transmission slot 505-j, similarly as discussed with respect to FIGS. 3 and 4. In this example, the acknowledgment feedback may be multiplexed with an uplink PUSCH transmission rather than being transmitted using a PUCCH transmission. In some cases, transmissions using transmission slots 505 may use licensed spectrum, unlicensed spectrum, or combinations thereof.

In this example, a first DCI 510 may be transmitted in the first slot 505-a, that may include downlink scheduling information for an associated first PDSCH transmission 515 of a first group in the first slot 505-a. In this example, the first DCI 510 may include CBG level group-based feedback parameters, K1=3 (i.e., that indicates the associated acknowledgment feedback is to be provided in fourth slot 505-d, as discussed with respect to FIG. 2), DAI=1 (i.e., that indicates the DAI is for an initial acknowledgment feedback indicator to be included in an acknowledgment sub-codebook), G=0 (i.e., that identifies first downlink transmission group), R=0 (i.e., a feedback report is requested for only the same group that is associated with the DCI), and NFI=0. In this example the first DCI 510 may include an explicit indication that CBG based feedback is requested. In this example, the DAI may indicate TBs for the CBG level feedback, and a maximum number of configured CBGs per TB (e.g., a maximum of four CBGs per TB, in this example, although other examples may have more or fewer CBGs per TB) may be used for determination if ACK/NACK bits.

In the example of FIG. 5, a second DCI 520 may schedule a second PDSCH transmission 525 of the first downlink transmission group in second slot 505-b. In this example, the second DCI 520 includes CBG level group-based feedback parameters of K1=2 (i.e., that the associated acknowledgment feedback is to be provided in the fourth slot **505-*d*), DAI=1 (i.e., that indicates the DAI is for an initial acknowledgment feedback indicator to be included in an acknowledgment sub-codebook), G=0 (i.e., for the same group as the first DCI 510 and first PDSCH transmission 515), R=0 (i.e., that feedback for another group is not requested), and NFI=0 (i.e., that the DAI has not been reset based on not being toggled from the prior DCI). In this example the second DCI 520 may include an explicit indication that TB based feedback is requested, and thus the DAI is associated with the TB level feedback, and has a same value as in the first DCI 510**.

In this example a third slot **505-*c* may include a third DCI 530 associated with a third PDSCH transmission 535 of the first downlink transmission group. In this example, the third DCI 530 includes TB level group-based feedback parameters of K1=1, DAI=2 (i.e., the next consecutive DCI for TB level feedback for the first group), G=0 (i.e., for the first group), R=0 (i.e., that feedback for another group is not requested), and NFI=0. In this example the third DCI 515** may include an explicit indication that TB based feedback is requested.

The UE receiving the downlink transmissions may format feedback sub-codebooks for transmission in PUCCH transmission 540 that, in this example, is not received at the base station (e.g., due to interference or LBT failure). Such sub-codebooks may include a first sub-codebook for reporting TB based feedback and a second sub-codebook for reporting CBG based feedback of the first group of downlink transmissions.

In this example, the base station may determine that the PUCCH transmission 540 is not successfully received. In this example in fifth slot **505-*e*, associated with the second downlink transmission group, the base station may transmit a fourth DCI 545 for an associated fourth PDSCH transmission 550. In this example, the fourth DCI 545 includes TB level group-based feedback parameters of K1=5 (i.e., that the associated acknowledgment feedback is to be provided in the tenth slot 505-*j***), DAI=1 (i.e., the initial DAI count for a first TB of the second group), G=1 (i.e., for the second downlink transmission group), R=1 (i.e., that feedback for both the first group and the second group is requested), NFI=0, and indication that TB level feedback is requested.

In this example, in sixth slot **505-*f*, associated with the second group of downlink transmissions, the base station may transmit a fifth DCI 555 for an associated fifth PDSCH transmission 560. In this example, the fifth DCI 555** includes TB level group-based feedback parameters of K1=4, DAI=2 (i.e., the next consecutive DAI count for TB feedback of the second group), G=1, R=1, NFI=0, and indication that TB level feedback is requested.

In the seventh slot **505-*g*, associated with the second group of downlink transmissions, the base station may transmit a sixth DCI 565 for an associated sixth PDSCH transmission 570. In this example, the sixth DCI 565 includes CBG level group-based feedback parameters of K1=3, DAI=1, G=1, R=1, NFI=0, and indication that CBG level feedback is requested. In the eighth slot 505-*h*, associated with the second group of downlink transmissions, the base station may transmit a seventh DCI 575 for an associated seventh PDSCH transmission 580. In this example, the seventh DCI 575** includes CBG level group-based feedback parameters of K1=2, DAI=2, G=1, R=1, NFI=0, and indication that CBG level feedback is requested.

The ninth slot **505-*i* may include an uplink DCI 585 transmission from the base station that indicates one or more parameters for the uplink transmission scheduling PUSCH and that the requested group-based acknowledgment feedback is to be multiplexed on PUSCH. In some cases, the uplink DCI may provide total DAI values for CBG and TB based feedback for each of the configured downlink transmission groups. In this example, the uplink DCI 585 may include a tDAI for TB feedback of the first downlink transmission group (i.e., tDAI for TB-based/group0=2), a tDAI for CBG feedback of the first downlink transmission group (i.e., tDAI for CBG-based/group0=1), a tDAI for TB feedback of the second downlink transmission group (i.e., tDAI for TB-based/group1=2), and a tDAI for CBG feedback of the second downlink transmission group (i.e., tDAI for CBG-based/group1=2). The uplink DCI 585 may provide such information along with multiplexing information for multiplexing the acknowledgment feedback with uplink shared channel transmissions from the UE (rather than transmitting the acknowledgment feedback on PUCCH). In other cases where less than four sub-codebooks may be used for transmitting acknowledgment feedback (e.g., in cases where only one group may have CBG or TB feedback, and the other groups have TB feedback only), fewer DAI fields may be provided in the uplink DCI 585**.

In this example, the uplink DCI 585 may include total DAI fields that are separately indicated for each sub-codebook that may be transmitted by the UE irrespective of whether different sub-codebooks are to be provided by the UE. Thus, even in the case of no CBG-based acknowledgment for any of the downlink transmission groups, an associated uplink total DAI field will be included. Thus, in cases where two or three total sub-codebooks may be provided, the total DAI fields will indicate values for each, and in cases where four sub-codebooks may be provided four total DAI fields are indicated in the uplink DCI 585. In such cases, when a last downlink DCI for a sub-codebook is missed, by using the uplink total DAI in the uplink DCI 585, dummy NACKs may be inserted at the end of the corresponding sub-codebook, and overall codebook size will be correct as the size of each sub-codebook is separately determined by the corresponding uplink total DAI field given in the UL DCI 585.

In this example, tenth slot **505-*i* may include uplink resources for transmitting the feedback report in a PUSCH transmission 590. In this case, the feedback report may include two sub-codebooks for the first group feedback 597, which includes TB based feedback sub-codebook 595 and CBG based feedback sub-codebook 596. Likewise, second group feedback 598, which includes TB based feedback sub-codebook 595 and CBG based feedback sub-codebook 596** may be transmitted.

In other cases, the uplink total DAI fields provided in the uplink DCI 585 are only indicated for CBG based sub-codebooks or TB based sub-codebooks, rather than different codebooks for each downlink transmission group. An example of such a technique is illustrated in FIG. 6.

Figure 6:
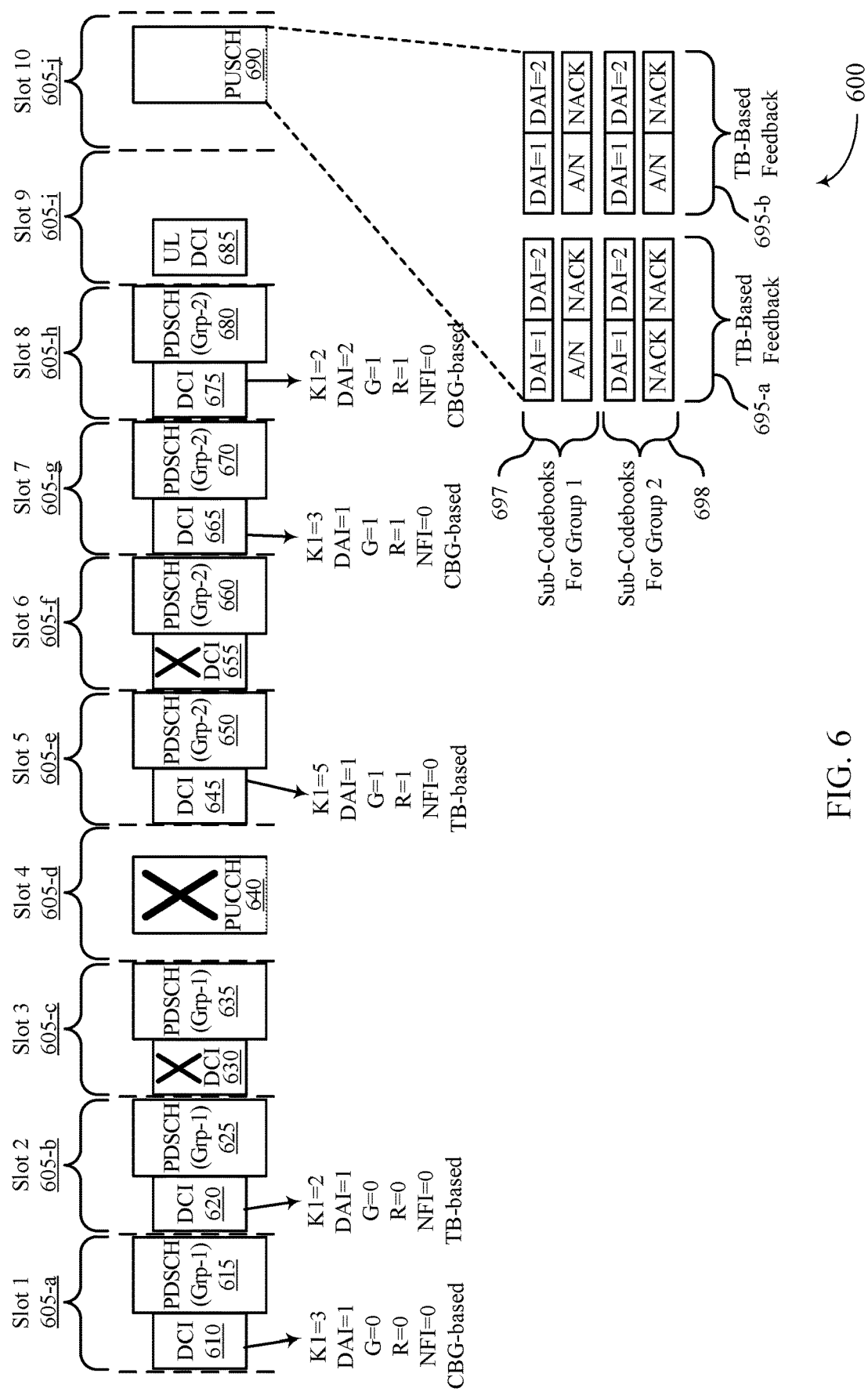

FIG. 6 illustrates an example of a feedback timeline 600 that supports CBG acknowledgment feedback techniques in wireless communications in accordance with aspects of the present disclosure. In some examples, feedback timeline 600 may implement aspects of wireless communications system 100 or 200. In this example, a number of transmission slots 605 are illustrated, including a first transmission slot **605-*a* through a tenth transmission slot 605-*j*, similarly as discussed with respect to FIGS. 3 through 5. In some cases, transmissions using transmission slots 605** may use licensed spectrum, unlicensed spectrum, or combinations thereof.

In this example, a first DCI 610 may be transmitted in the first slot **605-*a*, that may include downlink scheduling information for an associated first PDSCH transmission 615** of a first group in the first slot 605-*a*. In this example, the first DCI 610 may include CBG level group-based feedback parameters, K1=3, DAI=1, G=0, R=0, NFI=0, and an indication of CBG feedback. A second DCI 620 may schedule a second PDSCH transmission 625 of the first downlink transmission group in second slot 605-*b*. In this example, the second DCI 620 includes TB level group-based feedback parameters of K1=2, DAI=1, G=0, R=0, NFI=0, and indication that TB based feedback is requested.

In this example a third slot 605-*c* may include a third DCI 630 associated with a third PDSCH transmission 635 of the first downlink transmission group, and the UE may not receive the third DCI 630 (e.g., due to interference). Further, in this example, the UE receiving the downlink transmissions may format feedback sub-codebooks for transmission in PUCCH transmission 640 that is not received at the base station (e.g., due to interference or LBT failure).

In this example, the base station may determine that the PUCCH transmission 640 is not successfully received. In this example in fifth slot 605-*e*, associated with the second downlink transmission group, the base station may transmit a fourth DCI 645 for an associated fourth PDSCH transmission 650. In this example, the fourth DCI 645 includes TB level group-based feedback parameters of K1=5, DAI=1, G=1, R=1, NFI=0, and indication that TB level feedback is requested.

In this example, in sixth slot 605-*f*, associated with the second group of downlink transmissions, the base station may transmit a fifth DCI 655 for an associated fifth PDSCH transmission 660, where the fifth DCI 655 is not received at the UE.

In the seventh slot 605-*g*, associated with the second group of downlink transmissions, the base station may transmit a sixth DCI 665 for an associated sixth PDSCH transmission 670. In this example, the sixth DCI 665 includes CBG level group-based feedback parameters of K1=3, DAI=1, G=1, R=1, NFI=0, and indication that CBG level feedback is requested. In the eighth slot 605-*h*, associated with the second group of downlink transmissions, the base station may transmit a seventh DCI 675 for an associated seventh PDSCH transmission 680. In this example, the seventh DCI 675 includes CBG level group-based feedback parameters of K1=2, DAI=2, G=1, R=1, NFI=0, and indication that CBG level feedback is requested.

The ninth slot 605-*i* may include an uplink DCI 685 transmission from the base station that indicates one or more parameters for the uplink transmission to provide the requested group-based acknowledgment feedback. In this example, separate uplink total DAI fields are only indicated for one of the downlink transmission groups (e.g., group=0), and if the acknowledgment feedback report corresponds to both downlink transmission groups, the UE may apply the total DAI value given in the uplink DCI 685 for only one of the downlink transmission groups. For the other group, the total DAI from the last downlink DCI is used. The downlink transmission group for which the uplink total DAI is applied can be, if there is only one group in the report, the uplink total DAI field for that group. Otherwise, the uplink total DAI field may be applied for a fixed downlink transmission group (i.e., always for G=0, or always for G=1). In other cases, the indicated uplink total DAI for the TB based sub-codebook or the CBG based sub-codebook may be the "total-total" DAI across both downlink transmission groups. In such cases, the "total-total" DAI may be defined as the summation of total DAI for both the first and second downlink transmission groups (e.g., using a modulo operation). In such cases, if there is only one downlink transmission group in a given the feedback report, the total-total DAI is the total DAI of that group. Otherwise, the UE may determine the last total DAI received in downlink DCI for each of the downlink transmissions groups (i.e., t-DAI-0 and t-DAI-1), and if the total-total DAI in the uplink DCI 685 is equal to t-DAI-0+t-DAI-1 (with modulo operation), t-DAI-1 and t-DAI2 are used for determining the feedback codebooks for both downlink transmission groups.

If the total-total DAI is not equal to t-DAI-0+t-DAI-1, such as may happen in the example of FIG. 6 due to missed third DCI 630 and fifth DCI 655, one or more NACKs may be provided in the feedback codebooks. In this example, TB based codebooks are illustrated for cases where total-total DAI is provided, or where separate total DAIs are provided for each downlink transmission group. In cases where the total-total DAI is provided, TB based feedback 695-*a* may include a first sub-codebook 697 for the first group and a second sub-codebook 698 of the second group transmitted using PUSCH 690 in the tenth slot 605-*j*. In this example, the last downlink DCIs for each group is missed, and thus the total-total DAI in the uplink DCI 685 is not equal to t-DAI-0+t-DAI-1, and the UE does not know which group to which the missing DCIs correspond. However, the UE can determine the codebook size correctly based on total-total DAI, and the UE sets NACK for all the values after the last detected DCI for the first group in order to avoid confusion about the place of ACK/NACK indications. That is, even for DAI=1 of the second group (focusing on the TB-based codebooks) for which the DCI is detected, a NACK is placed in the sub-codebook irrespective of the decoding result of the corresponding PDSCH. As mentioned, the reason is to avoid confusion about the place of A/N in the second sub-codebook as the UE does not know which group the missing DCIs correspond to. The example of FIG. 6 also includes a second set of TB level feedback 695-*b* that illustrates the first sub-codebook 697 and the second sub-codebook 698 based on the uplink DCI 685 using separate DAI indicator for each group (e.g., first PDSCH group and second PDSCH group) for each of TB and CBG based feedback, in which case each sub-codebook simply includes a NACK associated with the corresponding missed DCI. As indicated above, sub-codebooks for CBG based acknowledgment feedback would be determined in a similar manner. In cases where there is no CBG based acknowledgment feedback, but the uplink DCI 685 already has two total DAI fields (i.e., CBG-based acknowledgment is configured but not used in a given report), the two uplink total DAI fields may be set to correspond to the two downlink transmission groups (i.e., G=0 and G=1), and feedback provided accordingly.

FIG. 7 shows a block diagram 700 of a device 705 that supports CBG acknowledgment feedback techniques in wireless communications in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to CBG acknowledgment feedback techniques in wireless communications, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive, from a base station, configuration information for group-based acknowledgment feedback for one or more of a first group of downlink transmissions to the UE or a second group of downlink transmissions to the UE, where the one or more of the first group of downlink transmissions or the second group of downlink transmissions are configured for acknowledgment feedback at a CBG level, receive a DCI transmission from the base station that indicates group-based acknowledgment feedback is to be provided for one or more of the first group of downlink transmissions or the second group of downlink transmissions in a first uplink transmission, determine, based on the configuration information for the group-based acknowledgment feedback, CBG level acknowledgment feedback associated with at least the first group of downlink transmissions, and transmit the CBG level acknowledgment feedback to the base station in the first uplink transmission.

The communications manager 715 may also receive, from a base station, configuration information for group-based acknowledgment feedback for at least a first group of downlink transmissions to the UE and a second group of downlink transmissions to the UE, where one or more of the first group of downlink transmissions or the second group of downlink transmissions are configured for acknowledgment feedback at a CBG level or a TB level, receive a DCI transmission from the base station that schedules a first uplink transmission in which acknowledgment feedback for one or more of the first group of downlink transmissions or the second group of downlink transmissions is to be multiplexed with uplink data in the first uplink transmission, where the DCI further indicates group-based acknowledgment feedback is to be provided for one or more of the first group of downlink transmissions or the second group of downlink transmissions, in the first uplink transmission, determine, based on the configuration information for the group-based acknowledgment feedback and the DCI, acknowledgment feedback associated with at least one of the first group of downlink transmissions or the second group of downlink transmissions, and transmit the acknowledgment feedback to the base station in the first uplink transmission. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 715 as described herein may be implemented to realize one or more potential advantages. One implementation may allow a UE 115 to save power and increase battery life by facilitating feedback for transmissions or retransmissions. Another implementation may provide improved quality and reliability of service at the UE 115, as latency and the number of separate resources allocated to the UE 115 may be reduced.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

FIG. 8 shows a block diagram 800 of a device 805 that supports CBG acknowledgment feedback techniques in wireless communications in accordance with aspects of the present disclosure. The device 805 may be an example of aspects of a device 705, or a UE 115 as described herein. The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to CBG acknowledgment feedback techniques in wireless communications, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a group-based feedback manager 820, a CBG feedback manager 825, a feedback determination manager 830, and a feedback transmission manager 835. The communications manager 815 may be an example of aspects of the communications manager 1010 described herein.

In some cases, the group-based feedback manager 820 may receive, from a base station, configuration information for group-based acknowledgment feedback for one or more of a first group of downlink transmissions to the UE or a second group of downlink transmissions to the UE, where the one or more of the first group of downlink transmissions or the second group of downlink transmissions are configured for acknowledgment feedback at a CBG level. The CBG feedback manager 825 may receive a DCI transmission from the base station that indicates group-based acknowledgment feedback is to be provided for one or more of the first group of downlink transmissions or the second group of downlink transmissions in a first uplink transmission. The feedback determination manager 830 may determine, based on the configuration information for the group-based acknowledgment feedback, CBG level acknowledgment feedback associated with at least the first group of downlink transmissions. The feedback transmission manager 835 may transmit the CBG level acknowledgment feedback to the base station in the first uplink transmission.

In some cases, the group-based feedback manager 820 may receive, from a base station, configuration information for group-based acknowledgment feedback for at least a first group of downlink transmissions to the UE and a second group of downlink transmissions to the UE, where one or more of the first group of downlink transmissions or the second group of downlink transmissions are configured for acknowledgment feedback at a CBG level or a TB level. The CBG feedback manager 825 may receive a DCI transmission from the base station that schedules a first uplink transmission in which acknowledgment feedback for one or more of the first group of downlink transmissions or the second group of downlink transmissions is to be multiplexed with uplink data in the first uplink transmission, where the DCI further indicates group-based acknowledgment feedback is to be provided for one or more of the first group of downlink transmissions or the second group of downlink transmissions, in the first uplink transmission. The feedback determination manager 830 may determine, based on the configuration information for the group-based acknowledgment feedback and the DCI, acknowledgment feedback associated with at least one of the first group of downlink transmissions or the second group of downlink transmissions. The feedback transmission manager 835 may transmit the acknowledgment feedback to the base station in the first uplink transmission.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

FIG. 9 shows a block diagram 900 of a communications manager 905 that supports CBG acknowledgment feedback techniques in wireless communications in accordance with aspects of the present disclosure. The communications manager 905 may be an example of aspects of a communications manager 715, a communications manager 815, or a communications manager 1010 described herein. The communications manager 905 may include a group-based feedback manager 910, a CBG feedback manager 915, a feedback determination manager 920, a feedback transmission manager 925, a group determination manager 930, and a DAI component 935. Each of these modules may communicate, directly or indirectly, with one another (e.g., via one or more buses).

The group-based feedback manager 910 may receive, from a base station, configuration information for group-based acknowledgment feedback for one or more of a first group of downlink transmissions to the UE or a second group of downlink transmissions to the UE, where the one or more of the first group of downlink transmissions or the second group of downlink transmissions are configured for acknowledgment feedback at a CBG level.

In some examples, the group-based feedback manager 910 may receive, from a base station, configuration information for group-based acknowledgment feedback for at least a first group of downlink transmissions to the UE and a second group of downlink transmissions to the UE, where one or more of the first group of downlink transmissions or the second group of downlink transmissions are configured for acknowledgment feedback at a CBG level or a TB level.

The CBG feedback manager 915 may receive a DCI transmission from the base station that indicates group-based acknowledgment feedback is to be provided for one or more of the first group of downlink transmissions or the second group of downlink transmissions in a first uplink transmission.

In some examples, the CBG feedback manager 915 may receive a DCI transmission from the base station that schedules a first uplink transmission in which acknowledgment feedback for one or more of the first group of downlink transmissions or the second group of downlink transmissions is to be multiplexed with uplink data in the first uplink transmission, where the DCI further indicates group-based acknowledgment feedback is to be provided for one or more of the first group of downlink transmissions or the second group of downlink transmissions, in the first uplink transmission.

In some examples, the CBG feedback manager 915 may receive an indication that only a single group of downlink transmissions is configured for group-based acknowledgment feedback, and where CBG level acknowledgment feedback is allowed for the group-based acknowledgment feedback of the single group of downlink transmissions. In some examples, the CBG feedback manager 915 may receive an indication that only a single group of downlink transmissions is available for CBG level acknowledgment feedback, and that any other group of downlink transmissions is to use a TB level acknowledgment feedback. In some examples, the CBG feedback manager 915 may receive an indication that either of the first group downlink transmissions or the second group of downlink transmissions is available for CBG level acknowledgment feedback, and where when CBG level acknowledgment feedback is configured for one group of downlink transmissions, other groups of downlink transmissions are to use a TB level acknowledgment feedback. In some examples, the CBG feedback manager 915 may receive an indication that either of the first group downlink transmissions or the second group of downlink transmissions is available for CBG level acknowledgment feedback or TB level acknowledgment feedback.

The feedback determination manager 920 may determine, based on the configuration information for the group-based acknowledgment feedback, CBG level acknowledgment feedback associated with at least the first group of downlink transmissions.

In some examples, the feedback determination manager 920 may determine, based on the configuration information for the group-based acknowledgment feedback and the DCI, acknowledgment feedback associated with at least one of the first group of downlink transmissions or the second group of downlink transmissions.

In some examples, the feedback determination manager 920 may four sub-codebooks are available for use in transmitting the group-based acknowledgment feedback, based on which of CBG based feedback or TB based feedback is to be provided for each of the first group of downlink transmissions and the second group of downlink transmissions. In some examples, the feedback determination manager 920 may determine which of the four codebooks are to be used for providing acknowledgment feedback associated with the first group of downlink transmissions and the second group of downlink transmissions based on one or more of which group of downlink transmissions is associated with the DCI that indicates that the group-based acknowledgment feedback is to be transmitted, one or more DAIs that indicates a number of CBGs or TBs that are associated with each of the first group of downlink transmissions or the second group of downlink transmissions, or any combinations thereof.

In some examples, the feedback determination manager 920 may determine, based on the uplink total DAI fields, that scheduling information from the base station was missed for one or more downlink transmissions of the first group of downlink transmissions. In some examples, the feedback determination manager 920 may insert a predetermined value for one or more feedback indicators associated with the missed scheduling information to provide a codebook size that corresponds with the uplink total DAI fields. In some examples, the feedback determination manager 920 may determine, based on one or more of the first uplink total DAI field or the second uplink total assignment indicator field, that scheduling information from the base station was missed for one or more downlink transmissions of the first group or second group of downlink transmissions. In some examples, the feedback determination manager 920 may insert a predetermined value for one or more feedback indicators associated with the missed scheduling information to provide a codebook size that corresponds with the first uplink total DAI field.

In some cases, a first sub-codebook for CBG level acknowledgment feedback or a second sub-codebook for TB level acknowledgment feedback is used to report the group-based acknowledgment feedback of the single group of downlink transmissions. In some cases, one or more of a DAI value or a new acknowledgment feedback indicator value is applied separately to each of the first sub-codebook or the second sub-codebook. In some cases, a first sub-codebook is associated with TB level acknowledgment feedback associated with the second group of downlink transmissions configured for TB level acknowledgment feedback, a second sub-codebook is associated with TB level acknowledgment feedback associated with the first group of downlink transmissions configured for either CBG or TB level acknowledgment feedback, and a third sub-codebook is associated with CBG level acknowledgment feedback associated with the first group of downlink transmissions.

In some examples, the feedback transmission manager 925 may transmit the acknowledgment feedback (e.g., CBG/TB based feedback) to the base station in the first uplink transmission.

The group determination manager 930 may identify a group indicator value in the DCI that indicates which of the CBG level or the TB level is to be used for the acknowledgment feedback for the associated group of downlink transmissions. In some examples, the group determination manager 930 may identify that a first group indicator value in the DCI indicates that CBG level acknowledgment feedback is to be provided for the first group of downlink transmissions. In some examples, the group determination manager 930 may determine acknowledgment feedback for the first group of downlink transmissions with CBG level acknowledgment irrespective of whether the first group of downlink transmissions is configured with TB level acknowledgment feedback or CBG level acknowledgment feedback. In some examples, the group determination manager 930 may identify that a second group indicator value in the DCI indicates that TB level acknowledgment feedback is to be provided for the first group of downlink transmissions. In some examples, the group determination manager 930 may determine acknowledgment feedback for the first group of downlink transmissions with TB level acknowledgment irrespective of whether the first group of downlink transmissions is configured with TB level acknowledgment feedback or CBG level acknowledgment feedback.

In some examples, the group determination manager 930 may identify a group indicator value in the DCI that indicates that first acknowledgment feedback for the second group of downlink transmissions is to be reported at the TB level and that second acknowledgment feedback for the first group of downlink transmissions is to be reported at the TB level and provided with the first acknowledgment feedback. In some examples, the group determination manager 930 may determine, based on the group indicator value, that the first sub-codebook is to be used for the second group of downlink transmissions and the second sub-codebook is to be used for the first group of downlink transmissions. In some examples, the group determination manager 930 may identify a group indicator value in the DCI that indicates that first acknowledgment feedback for the first group of downlink transmissions is to be reported at the CBG level and that second acknowledgment feedback for the second group of downlink transmissions is to be reported at the TB level and provided with the first acknowledgment feedback.

In some examples, the group determination manager 930 may determine, based on the group indicator value, that the first sub-codebook is to be used for the second group of downlink transmissions and the third sub-codebook is to be used for the first group of downlink transmissions. In some examples, the group determination manager 930 may identify a group indicator value in the DCI that indicates that first acknowledgment feedback for the first group of downlink transmissions is to be reported at both the CBG level and the TB level, and that indicates that second acknowledgment feedback for the second group of downlink transmissions is to be reported at the TB level and provided with the first acknowledgment feedback. In some examples, the group determination manager 930 may determine, based on the group indicator value, that the first sub-codebook is to be used for the second group of downlink transmissions and that both the second sub-codebook and the third sub-codebook are to be used for the first group of downlink transmissions. In some cases, a first sub-codebook is associated with CBG level acknowledgment feedback and a second sub-codebook is associated with TB level acknowledgment feedback, and the UE selects the first sub-codebook or the second sub-codebook based on the group indicator value.

The DAI component 935 may receive a first downlink assignment indictor that indicates a first number of TBs of the second group of downlink transmissions and a second downlink assignment indictor that indicates a second number of TBs of the first group of downlink transmissions. In some examples, the DAI component 935 may receive a first downlink assignment indictor that indicates a first number of CBGs of the first group of downlink transmissions and a second downlink assignment indictor that indicates a second number of TBs of the second group of downlink transmissions. In some examples, the DAI component 935 may receive a first downlink assignment indictor that indicates a first number of CBGs of the first group of downlink transmissions, a second downlink assignment indictor that indicates a second number of TBs of the first group of downlink transmissions and a third downlink assignment indictor that indicates a third number of TBs of the second group of downlink transmissions. In some examples, the DAI component 935 may receive only a first downlink assignment indictor that indicates a first number of transmissions of the first group of downlink transmissions, and determining a second number of transmissions of the second group of downlink transmissions based on the first downlink assignment indictor.

In some examples, the DAI component 935 may receive uplink total DAI fields for each of the first group of downlink transmissions and the second group of downlink transmissions, and where the acknowledgment feedback is determined based on the uplink total DAI fields. In some examples, the DAI component 935 may receive a first uplink total DAI field for TB based uplink acknowledgment feedback for the first group of downlink transmissions or the second group of downlink transmissions, and a second uplink total DAI field for CBG based uplink acknowledgment feedback for the first group of downlink transmissions or the second group of downlink transmissions.

In some examples, the DAI component 935 may determine which of the first group of downlink transmissions or the second group of downlink transmissions is associated with the first uplink total DAI field based on feedback for which of the first group of downlink transmissions or the second group of downlink transmissions is scheduled to be included in the acknowledgment feedback.

In some examples, the DAI component 935 may determine which of the first group of downlink transmissions or the second group of downlink transmissions is associated with the first uplink total DAI field based on a fixed association between the first uplink total DAI field and one of the first group of downlink transmissions or the second group of downlink transmissions. In some examples, the DAI component 935 may determine, based on the aggregate total number of downlink transmissions and DAIs of a latest scheduled downlink transmission for each of the first group of downlink transmissions and the second group of downlink transmissions, a first number of downlink transmissions of the first group of downlink transmissions and a second number downlink transmissions of the second group of downlink transmissions to be included in the acknowledgment feedback.

In some examples, the fixed association is between the first uplink total DAI field and the first group of downlink transmissions.

In some examples, the when CBG based acknowledgment feedback is not enabled, the first uplink total DAI field indicates a first number of TB based downlink transmissions of the first group of downlink transmissions to be included in the acknowledgment feedback, and the second uplink total DAI field indicates a second number of TB based downlink transmissions of the second group of downlink transmissions to be included in the acknowledgment feedback. In some cases, the uplink total DAI fields for each of the first group of downlink transmissions and the second group of downlink transmissions include one or more of a first DAI field associated with a first codebook for TB level acknowledgment feedback of the first group of downlink transmissions or a second DAI field associated with a second codebook for CBG level acknowledgment feedback of the first group of downlink transmissions, and one or more of a third DAI field associated with a third codebook for TB level acknowledgment feedback of the second group of downlink transmissions or a fourth DAI field associated with a fourth codebook for CBG level acknowledgment feedback of the second group of downlink transmissions.

In some cases, the first uplink total DAI field indicates a first number of downlink transmissions of one of the first group of downlink transmissions or the second group of downlink transmissions to be included in the acknowledgment feedback, and where a second number of downlink transmissions of the other group of downlink transmissions to be included in the acknowledgment feedback is determined based on a downlink transmission from the base station that scheduled a latest downlink transmission of the other group of downlink transmissions. In some cases, the first uplink total DAI field and the second uplink total DAI field each indicate an aggregate total number of number of downlink transmissions from both of the first group of downlink transmissions and the second group of downlink transmissions to be included in the acknowledgment feedback.

FIG. 10 shows a diagram of a system 1000 including a device 1005 that supports CBG acknowledgment feedback techniques in wireless communications in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive, from a base station, configuration information for group-based acknowledgment feedback for one or more of a first group of downlink transmissions to the UE or a second group of downlink transmissions to the UE, where the one or more of the first group of downlink transmissions or the second group of downlink transmissions are configured for acknowledgment feedback at a CBG level, receive a DCI transmission from the base station that indicates group-based acknowledgment feedback is to be provided for one or more of the first group of downlink transmissions or the second group of downlink transmissions in a first uplink transmission, determine, based on the configuration information for the group-based acknowledgment feedback, CBG level acknowledgment feedback associated with at least the first group of downlink transmissions, and transmit the CBG level acknowledgment feedback to the base station in the first uplink transmission.

The communications manager 1010 may also receive, from a base station, configuration information for group-based acknowledgment feedback for at least a first group of downlink transmissions to the UE and a second group of downlink transmissions to the UE, where one or more of the first group of downlink transmissions or the second group of downlink transmissions are configured for acknowledgment feedback at a CBG level or a TB level, receive a DCI transmission from the base station that schedules a first uplink transmission in which acknowledgment feedback for one or more of the first group of downlink transmissions or the second group of downlink transmissions is to be multiplexed with uplink data in the first uplink transmission, where the DCI further indicates group-based acknowledgment feedback is to be provided for one or more of the first group of downlink transmissions or the second group of downlink transmissions, in the first uplink transmission, determine, based on the configuration information for the group-based acknowledgment feedback and the DCI, acknowledgment feedback associated with at least one of the first group of downlink transmissions or the second group of downlink transmissions, and transmit the acknowledgment feedback to the base station in the first uplink transmission.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting CBG acknowledgment feedback techniques in wireless communications).

Based on providing group-based feedback for multiple downlink transmissions in a single uplink communication, a UE 115 may efficiently facilitate feedback for wireless communications. As such, the processor 1040 may reduce processing power by eliminating multiple uplink communications.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

FIG. 11 shows a block diagram 1100 of a device 1105 that supports CBG acknowledgment feedback techniques in wireless communications in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to CBG acknowledgment feedback techniques in wireless communications, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit, to a UE, configuration information for group-based acknowledgment feedback for one or more of a first group of downlink transmissions to the UE or a second group of downlink transmissions to the UE, where the one or more of the first group of downlink transmissions or the second group of downlink transmissions are configured for acknowledgment feedback at a CBG level, transmit a DCI transmission to the UE that indicates CBG level acknowledgment feedback is to be provided for at least the first group of downlink transmissions in a first uplink transmission, and receive the CBG level acknowledgment feedback from the UE in the first uplink transmission.

The communications manager 1115 may also transmit, to a UE, configuration information for group-based acknowledgment feedback for at least a first group of downlink transmissions to the UE and a second group of downlink transmissions to the UE, where one or more of the first group of downlink transmissions or the second group of downlink transmissions are configured for acknowledgment feedback at a CBG level or a TB level, transmit a DCI transmission to the UE that schedules a first uplink transmission in which acknowledgment feedback for one or more of the first group of downlink transmissions or the second group of downlink transmissions is to be multiplexed with uplink data in the first uplink transmission, where the DCI further indicates group-based acknowledgment feedback is to be provided for at least one of the first group of downlink transmissions or the second group of downlink transmissions, and receive the acknowledgment feedback from the UE in the first uplink transmission. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the base station communications manager 1115 as described herein may be implemented to realize one or more potential advantages. One implementation may allow a base station 105 to save power by facilitating feedback for transmissions or retransmissions. Another implementation may provide improved quality and reliability of service at the base station 105, as latency and the number of separate resources allocated to the base station 105 may be reduced.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

FIG. 12 shows a block diagram 1200 of a device 1205 that supports CBG acknowledgment feedback techniques in wireless communications in accordance with aspects of the present disclosure. The device 1205 may be an example of aspects of a device 1105, or a base station 105 as described herein. The device 1205 may include a receiver 1210, a communications manager 1215, and a transmitter 1240. The device 1205 may also include a processor. Each of these components may be in communication with one another (e.g., via one or more buses).

The receiver 1210 may receive information such as packets, user data, or control information associated with various information channels (e.g., control channels, data channels, and information related to CBG acknowledgment feedback techniques in wireless communications, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a feedback configuration manager 1220, a group determination manager 1225, a group-based feedback manager 1230, and a feedback determination manager 1235. The communications manager 1215 may be an example of aspects of the communications manager 1410 described herein.

The feedback configuration manager 1220 may transmit, to a UE, configuration information for group-based acknowledgment feedback for one or more of a first group of downlink transmissions to the UE or a second group of downlink transmissions to the UE, where the one or more of the first group of downlink transmissions or the second group of downlink transmissions are configured for acknowledgment feedback at a CBG level. The group determination manager 1225 may determine to request CBG level acknowledgment feedback associated for at least the first group of downlink transmissions. The group-based feedback manager 1230 may transmit a DCI transmission to the UE that indicates CBG level acknowledgment feedback is to be provided for at least the first group of downlink transmissions in a first uplink transmission. The feedback determination manager 1235 may receive the CBG level acknowledgment feedback from the UE in the first uplink transmission.

The feedback configuration manager 1220 may transmit, to a UE, configuration information for group-based acknowledgment feedback for at least a first group of downlink transmissions to the UE and a second group of downlink transmissions to the UE, where one or more of the first group of downlink transmissions or the second group of downlink transmissions are configured for acknowledgment feedback at a CBG level or a TB level. The group determination manager 1225 may determine to request CBG level acknowledgment feedback associated for at least the first group of downlink transmissions. The group-based feedback manager 1230 may transmit a DCI transmission to the UE that schedules a first uplink transmission in which acknowledgment feedback for one or more of the first group of downlink transmissions or the second group of downlink transmissions is to be multiplexed with uplink data in the first uplink transmission, where the DCI further indicates group-based acknowledgment feedback is to be provided for at least one of the first group of downlink transmissions or the second group of downlink transmissions. The feedback determination manager 1235 may receive the acknowledgment feedback from the UE in the first uplink transmission.

The transmitter 1240 may transmit signals generated by other components of the device 1205. In some examples, the transmitter 1240 may be collocated with a receiver 1210 in a transceiver module. For example, the transmitter 1240 may be an example of aspects of the transceiver 1420 described with reference to FIG. 14. The transmitter 1240 may utilize a single antenna or a set of antennas.

FIG. 13 shows a block diagram 1300 of a communications manager 1305 that supports CBG acknowledgment feedback techniques in wireless communications in accordance with aspects of the present disclosure. The communications manager 1305 may be an example of aspects of a communications manager 1115, a communications manager 1215, or a communications manager 1410 described herein. The communications manager 1305 may include a feedback configuration manager 1310, a group determination manager 1315, a group-based feedback manager 1320, a feedback determination manager 1325, and a DAI component 1330. Each of these modules may communicate, directly or indirectly, with one another (e.g., via one or more buses).

The feedback configuration manager 1310 may transmit, to a UE, configuration information for group-based acknowledgment feedback for one or more of a first group of downlink transmissions to the UE or a second group of downlink transmissions to the UE, where the one or more of the first group of downlink transmissions or the second group of downlink transmissions are configured for acknowledgment feedback at a CBG level. In some examples, the feedback configuration manager 1310 may transmit, to a UE, configuration information for group-based acknowledgment feedback for at least a first group of downlink transmissions to the UE and a second group of downlink transmissions to the UE, where one or more of the first group of downlink transmissions or the second group of downlink transmissions are configured for acknowledgment feedback at a CBG level or a TB level.

The group determination manager 1315 may determine to request CBG level acknowledgment feedback associated for at least the first group of downlink transmissions.

The group-based feedback manager 1320 may transmit a DCI transmission to the UE that indicates CBG level acknowledgment feedback is to be provided for at least the first group of downlink transmissions in a first uplink transmission. In some examples, the group-based feedback manager 1320 may transmit a DCI transmission to the UE that schedules a first uplink transmission in which acknowledgment feedback for one or more of the first group of downlink transmissions or the second group of downlink transmissions is to be multiplexed with uplink data in the first uplink transmission, where the DCI further indicates group-based acknowledgment feedback is to be provided for at least one of the first group of downlink transmissions or the second group of downlink transmissions.

The feedback determination manager 1325 may receive the CBG level acknowledgment feedback from the UE in the first uplink transmission. In some examples, the feedback determination manager 1325 may receive the acknowledgment feedback from the UE in the first uplink transmission.

The DAI component 1330 may identify DAI for transmissions. In some cases, the DCI further includes uplink total DAI fields for each of the first group of downlink transmissions and the second group of downlink transmissions, and where the acknowledgment feedback is determined based on the uplink total DAI fields.

FIG. 14 shows a diagram of a system 1400 including a device 1405 that supports CBG acknowledgment feedback techniques in wireless communications in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may transmit, to a UE, configuration information for group-based acknowledgment feedback for one or more of a first group of downlink transmissions to the UE or a second group of downlink transmissions to the UE, where the one or more of the first group of downlink transmissions or the second group of downlink transmissions are configured for acknowledgment feedback at a CBG level, transmit a DCI transmission to the UE that indicates CBG level acknowledgment feedback is to be provided for at least the first group of downlink transmissions in a first uplink transmission, and receive the CBG level acknowledgment feedback from the UE in the first uplink transmission.

The communications manager 1410 may also transmit, to a UE, configuration information for group-based acknowledgment feedback for at least a first group of downlink transmissions to the UE and a second group of downlink transmissions to the UE, where one or more of the first group of downlink transmissions or the second group of downlink transmissions are configured for acknowledgment feedback at a CBG level or a TB level, transmit a DCI transmission to the UE that schedules a first uplink transmission in which acknowledgment feedback for one or more of the first group of downlink transmissions or the second group of downlink transmissions is to be multiplexed with uplink data in the first uplink transmission, where the DCI further indicates group-based acknowledgment feedback is to be provided for at least one of the first group of downlink transmissions or the second group of downlink transmissions, and receive the acknowledgment feedback from the UE in the first uplink transmission.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting CBG acknowledgment feedback techniques in wireless communications).

Based on providing group-based feedback for multiple downlink transmissions in a single uplink communication, a base station 105 may efficiently facilitate feedback for wireless communications. As such, the processor 1440 may reduce processing power by eliminating the reception and decoding of multiple uplink communications.

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
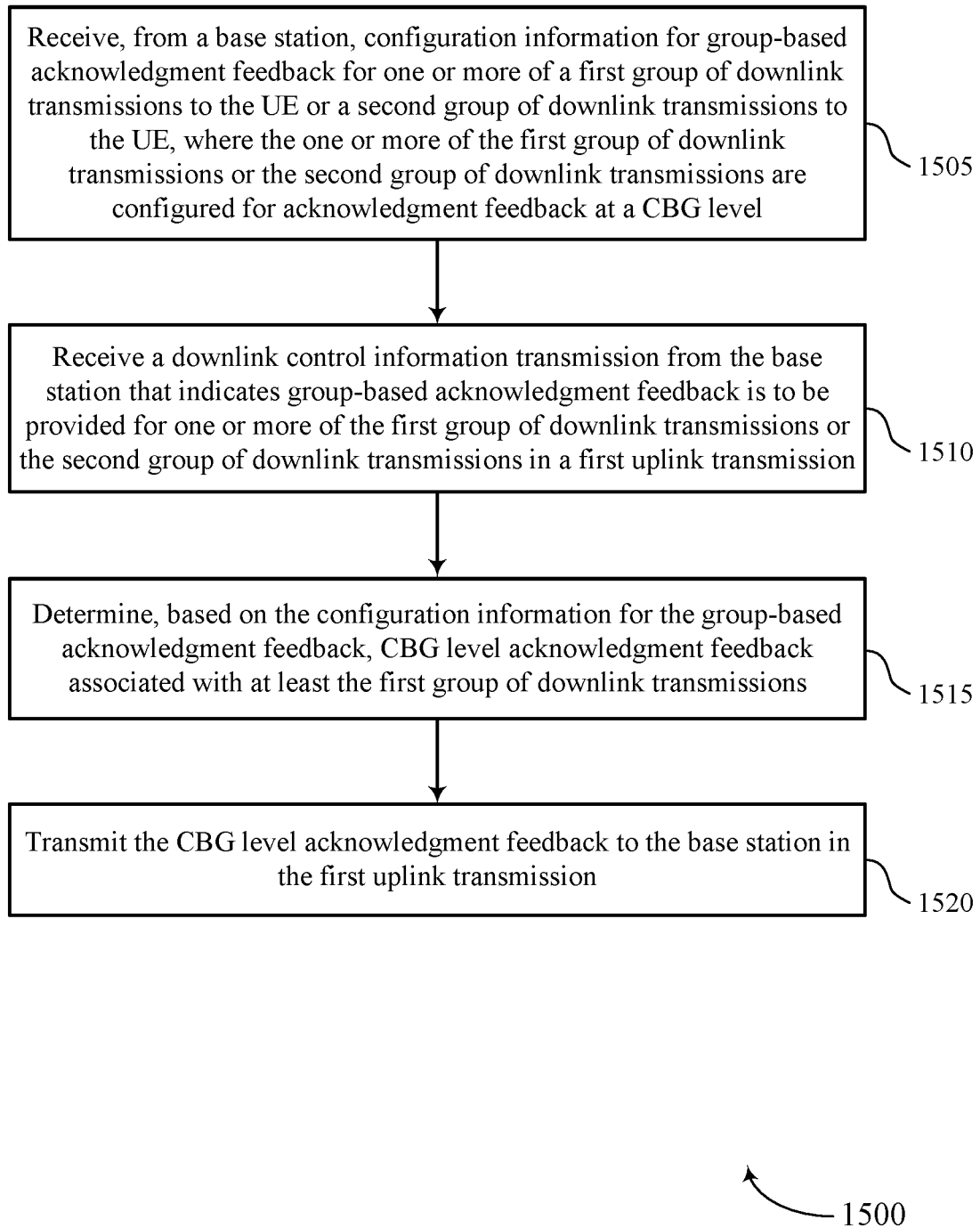

FIG. 15 shows a flowchart illustrating a method 1500 that supports CBG acknowledgment feedback techniques in wireless communications in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, configuration information for group-based acknowledgment feedback for one or more of a first group of downlink transmissions to the UE or a second group of downlink transmissions to the UE, where the one or more of the first group of downlink transmissions or the second group of downlink transmissions are configured for acknowledgment feedback at a CBG level. The operations of 1505 may be performed according to the methods described herein. In some examples, aspects of the operations of 1505 may be performed by a group-based feedback manager as described with reference to FIGS. 7 through 10.

At 1510, the UE may receive a DCI transmission from the base station that indicates group-based acknowledgment feedback is to be provided for one or more of the first group of downlink transmissions or the second group of downlink transmissions in a first uplink transmission. The operations of 1510 may be performed according to the methods described herein. In some examples, aspects of the operations of 1510 may be performed by a CBG feedback manager as described with reference to FIGS. 7 through 10.

At 1515, the UE may determine, based on the configuration information for the group-based acknowledgment feedback, CBG level acknowledgment feedback associated with at least the first group of downlink transmissions. The operations of 1515 may be performed according to the methods described herein. In some examples, aspects of the operations of 1515 may be performed by a feedback determination manager as described with reference to FIGS. 7 through 10.

At 1520, the UE may transmit the CBG level acknowledgment feedback to the base station in the first uplink transmission. The operations of 1520 may be performed according to the methods described herein. In some examples, aspects of the operations of 1520 may be performed by a feedback transmission manager as described with reference to FIGS. 7 through 10.

Figure 16:
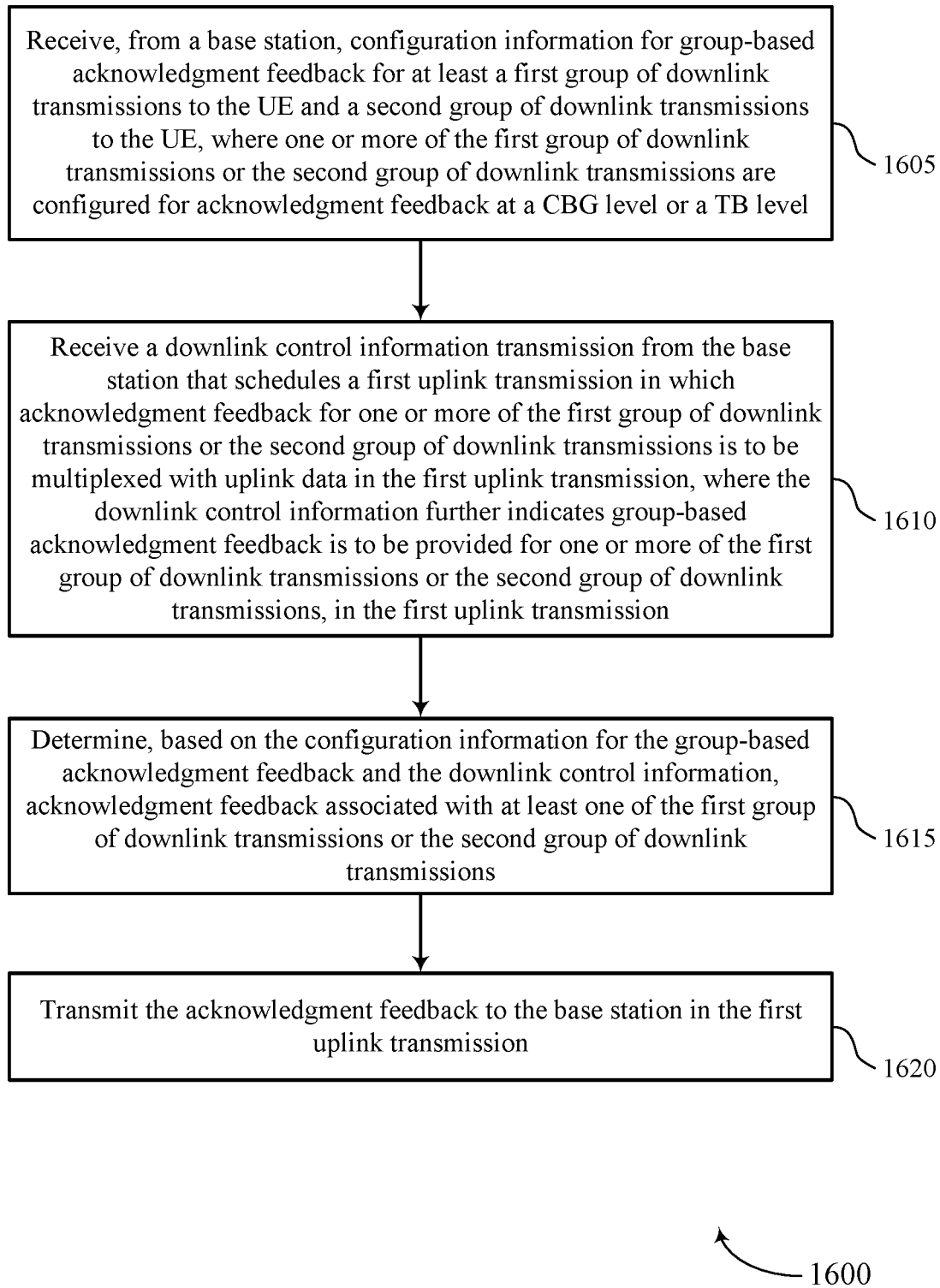

FIG. 16 shows a flowchart illustrating a method 1600 that supports CBG acknowledgment feedback techniques in wireless communications in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, configuration information for group-based acknowledgment feedback for at least a first group of downlink transmissions to the UE and a second group of downlink transmissions to the UE, where one or more of the first group of downlink transmissions or the second group of downlink transmissions are configured for acknowledgment feedback at a CBG level or a TB level. The operations of 1605 may be performed according to the methods described herein. In some examples, aspects of the operations of 1605 may be performed by a group-based feedback manager as described with reference to FIGS. 7 through 10.

At 1610, the UE may receive a DCI transmission from the base station that schedules a first uplink transmission in which acknowledgment feedback for one or more of the first group of downlink transmissions or the second group of downlink transmissions is to be multiplexed with uplink data in the first uplink transmission, where the DCI further indicates group-based acknowledgment feedback is to be provided for one or more of the first group of downlink transmissions or the second group of downlink transmissions, in the first uplink transmission. The operations of 1610 may be performed according to the methods described herein. In some examples, aspects of the operations of 1610 may be performed by a CBG feedback manager as described with reference to FIGS. 7 through 10.

At 1615, the UE may determine, based on the configuration information for the group-based acknowledgment feedback and the DCI, acknowledgment feedback associated with at least one of the first group of downlink transmissions or the second group of downlink transmissions. The operations of 1615 may be performed according to the methods described herein. In some examples, aspects of the operations of 1615 may be performed by a feedback determination manager as described with reference to FIGS. 7 through 10.

At 1620, the UE may transmit the acknowledgment feedback to the base station in the first uplink transmission. The operations of 1620 may be performed according to the methods described herein. In some examples, aspects of the operations of 1620 may be performed by a feedback transmission manager as described with reference to FIGS. 7 through 10.

Figure 17:
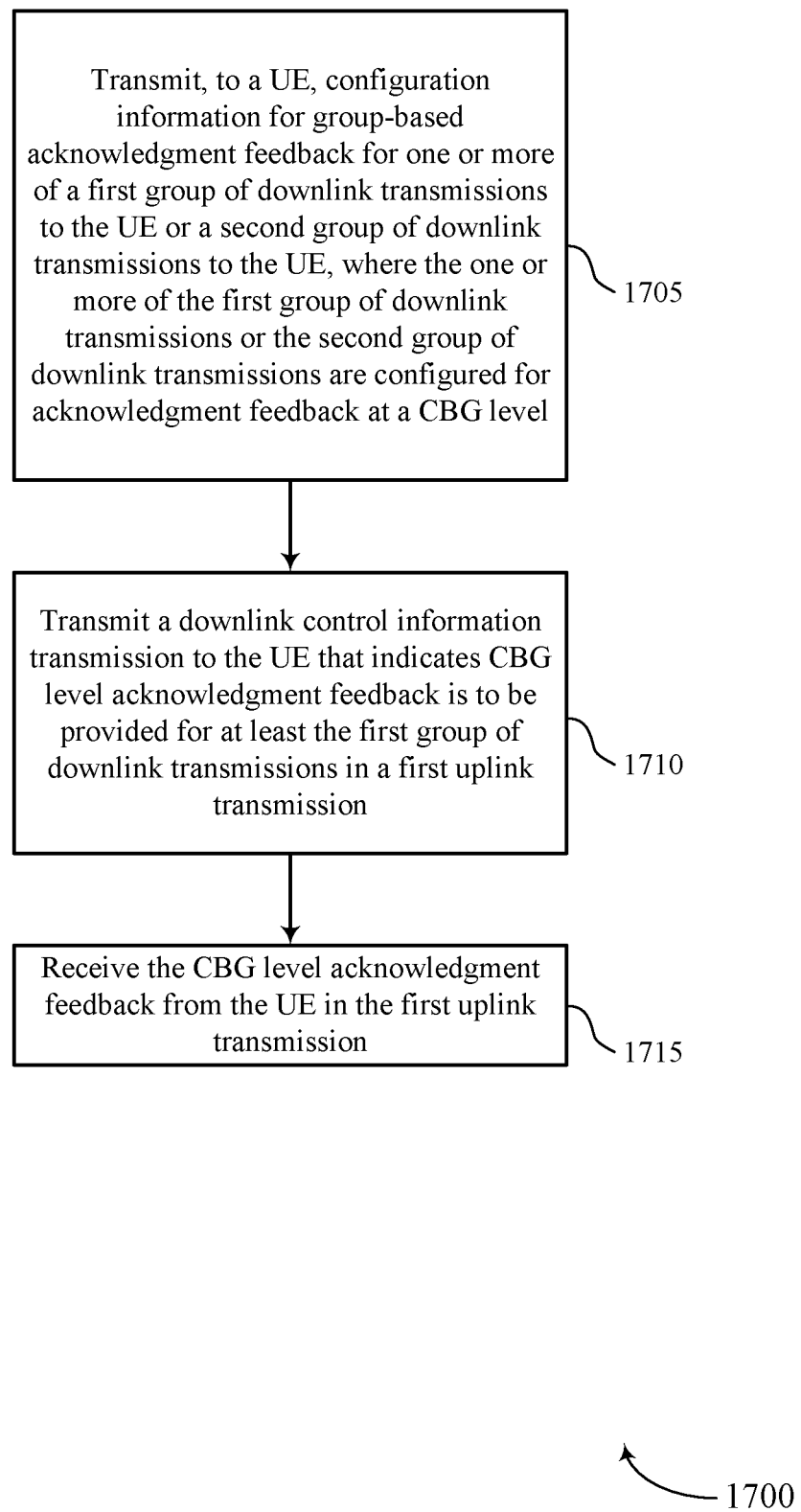

FIG. 17 shows a flowchart illustrating a method 1700 that supports CBG acknowledgment feedback techniques in wireless communications in accordance with aspects of the present disclosure. The operations of method 1700 may be implemented by a base station 105 or its components as described herein. For example, the operations of method 1700 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1705, the base station may transmit, to a UE, configuration information for group-based acknowledgment feedback for one or more of a first group of downlink transmissions to the UE or a second group of downlink transmissions to the UE, where the one or more of the first group of downlink transmissions or the second group of downlink transmissions are configured for acknowledgment feedback at a CBG level. The operations of 1705 may be performed according to the methods described herein. In some examples, aspects of the operations of 1705 may be performed by a feedback configuration manager as described with reference to FIGS. 11 through 14.

At 1710, the base station may transmit a DCI transmission to the UE that indicates CBG level acknowledgment feedback is to be provided for at least the first group of downlink transmissions in a first uplink transmission. The operations of 1710 may be performed according to the methods described herein. In some examples, aspects of the operations of 1710 may be performed by a group-based feedback manager as described with reference to FIGS. 11 through 14.

At 1715, the base station may receive the CBG level acknowledgment feedback from the UE in the first uplink transmission. The operations of 1715 may be performed according to the methods described herein. In some examples, aspects of the operations of 1715 may be performed by a feedback determination manager as described with reference to FIGS. 11 through 14.

Figure 18:
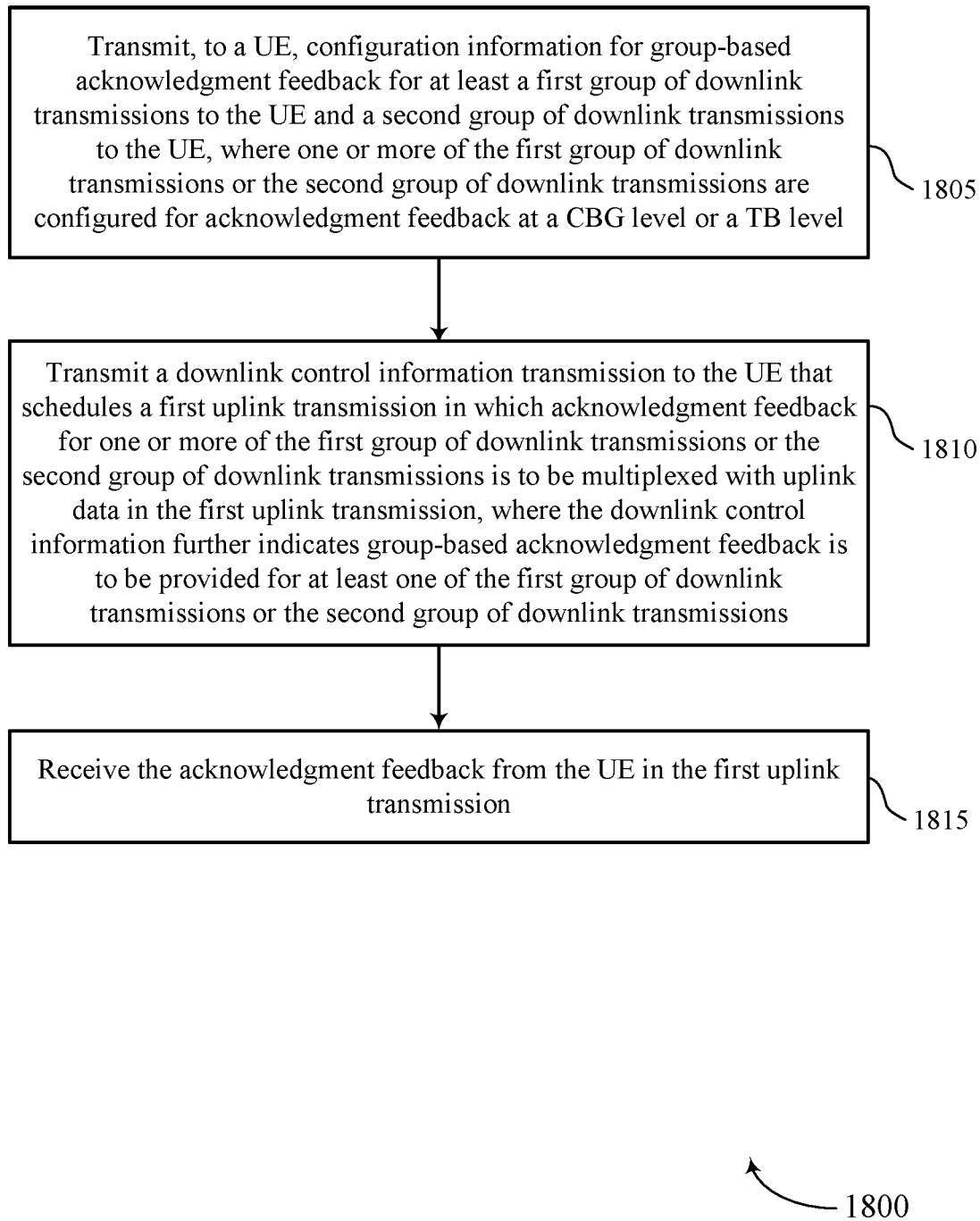

FIG. 18 shows a flowchart illustrating a method 1800 that supports code-block-group acknowledgment feedback techniques in wireless communications in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1805, the base station may transmit, to a UE, configuration information for group-based acknowledgment feedback for at least a first group of downlink transmissions to the UE and a second group of downlink transmissions to the UE, where one or more of the first group of downlink transmissions or the second group of downlink transmissions are configured for acknowledgment feedback at a CBG level or a TB level. The operations of 1805 may be performed according to the methods described herein. In some examples, aspects of the operations of 1805 may be performed by a feedback configuration manager as described with reference to FIGS. 11 through 14.

At 1810, the base station may transmit a DCI transmission to the UE that schedules a first uplink transmission in which acknowledgment feedback for one or more of the first group of downlink transmissions or the second group of downlink transmissions is to be multiplexed with uplink data in the first uplink transmission, where the DCI further indicates group-based acknowledgment feedback is to be provided for at least one of the first group of downlink transmissions or the second group of downlink transmissions. The operations of 1810 may be performed according to the methods described herein. In some examples, aspects of the operations of 1810 may be performed by a group-based feedback manager as described with reference to FIGS. 11 through 14.

At 1815, the base station may receive the acknowledgment feedback from the UE in the first uplink transmission. The operations of 1815 may be performed according to the methods described herein. In some examples, aspects of the operations of 1815 may be performed by a feedback determination manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
receiving, from a base station, configuration information for group-based acknowledgment feedback for at least a first group of downlink transmissions to the UE and a second group of downlink transmissions to the UE, wherein one or more of the first group of downlink transmissions or the second group of downlink transmissions are configured for acknowledgment feedback at a code-block-group level or a transport-block level;
receiving a downlink control information transmission from the base station that schedules a first uplink transmission in which acknowledgment feedback for one or more of the first group of downlink transmissions or the second group of downlink transmissions is to be multiplexed with uplink data in the first uplink transmission, wherein:
group-based acknowledgment feedback is to be provided for one or more of the first group of downlink transmissions or the second group of downlink transmissions, in the first uplink transmission;

receiving the downlink control information transmission comprises receiving uplink total downlink assignment indicator fields for each of the first group of downlink transmissions and the second group of downlink transmissions;

the acknowledgment feedback is determined based at least in part on the uplink total downlink assignment indicator fields; and the uplink total downlink assignment indicator fields for each of the first group of downlink transmissions and the second group of downlink transmissions include one or more of a first downlink assignment indicator field associated with a first codebook for transport-block level acknowledgment feedback of the first group of downlink transmissions or a second downlink assignment indicator field associated with a second codebook for code-block-group level acknowledgment feedback of the first group of downlink transmissions;

determining, based at least in part on the configuration information for the group-based acknowledgment feedback and the downlink control information transmission, acknowledgment feedback associated with at least one of the first group of downlink transmissions or the second group of downlink transmissions; and transmitting the acknowledgment feedback to the base station in the first uplink transmission.

2. The method of claim 1, wherein the uplink total downlink assignment indicator fields for each of the first group of downlink transmissions and the second group of downlink transmissions further include one or more of a third downlink assignment indicator field associated with a third codebook for transport-block level acknowledgment feedback of the second group of downlink transmissions or a fourth downlink assignment indicator field associated with a fourth codebook for code-block-group level acknowledgment feedback of the second group of downlink transmissions.

3. The method of claim 1, wherein the determining further comprises:
determining, based at least in part on the uplink total downlink assignment indicator fields, that scheduling information from the base station was missed for one or more downlink transmissions of the first group of downlink transmissions.

4. The method of claim 3, wherein the determining further comprises:
inserting a predetermined value for one or more feedback indicators associated with the missed scheduling information.

5. The method of claim 4, wherein the predetermined value is inserted to provide a codebook size that corresponds with the uplink total downlink assignment indicator fields.

6. A method for wireless communication at a base station comprising:
transmitting, to a user equipment (UE), configuration information for group-based acknowledgment feedback for at least a first group of downlink transmissions to the UE and a second group of downlink transmissions to the UE, wherein one or more of the first group of downlink transmissions or the second group of downlink transmissions are configured for acknowledgment feedback at a code-block-group level or a transport-block level;

transmitting a downlink control information transmission to the UE that schedules a first uplink transmission in which acknowledgment feedback for one or more of the first group of downlink transmissions or the second group of downlink transmissions is to be multiplexed with uplink data in the first uplink transmission, wherein:

group-based acknowledgment feedback is to be provided for at least one of the first group of downlink transmissions or the second group of downlink transmissions;

transmitting the downlink control information transmission comprises transmitting uplink total downlink assignment indicator fields for each of the first group of downlink transmissions and the second group of downlink transmissions;

the acknowledgment feedback is determined based at least in part on the uplink total downlink assignment indicator fields; and the uplink total downlink assignment indicator fields for each of the first group of downlink transmissions and the second group of downlink transmissions include one or more of a first downlink assignment indicator field associated with a first codebook for transport-block level acknowledgment feedback of the first group of downlink transmissions or a second downlink assignment indicator field associated with a second codebook for code-block-group level acknowledgment feedback of the first group of downlink transmissions; and receiving the acknowledgment feedback from the UE in the first uplink transmission.

7. The method of claim 6, wherein the uplink total downlink assignment indicator fields for each of the first group of downlink transmissions and the second group of downlink transmissions further include one or more of a third downlink assignment indicator field associated with a third codebook for transport-block level acknowledgment feedback of the second group of downlink transmissions or a fourth downlink assignment indicator field associated with a fourth codebook for code-block-group level acknowledgment feedback of the second group of downlink transmissions.

8. An apparatus for wireless communication at a user equipment (UE), comprising:
a processor;
memory coupled with the processor; and
instructions stored in the memory and executable by the processor to cause the apparatus to:
receive, from a base station, configuration information for group-based acknowledgment feedback for at least a first group of downlink transmissions to the UE and a second group of downlink transmissions to the UE, wherein one or more of the first group of downlink transmissions or the second group of downlink transmissions are configured for acknowledgment feedback at a code-block-group level or a transport-block level;

receive a downlink control information transmission from the base station that schedules a first uplink transmission in which acknowledgment feedback for one or more of the first group of downlink transmissions or the second group of downlink transmissions is to be multiplexed with uplink data in the first uplink transmission, wherein:

group-based acknowledgment feedback is to be provided for one or more of the first group of downlink transmissions or the second group of downlink transmissions, in the first uplink transmission;

the instructions to receive the downlink control information transmission are further executable by the processor to cause the apparatus to receive uplink total downlink assignment indicator fields for each of the first group of downlink transmissions and the second group of downlink transmissions;

the acknowledgment feedback is determined based at least in part on the uplink total downlink assignment indicator fields; and the uplink total downlink assignment indicator fields for each of the first group of downlink transmissions and the second group of downlink transmissions include one or more of a first downlink assignment indicator field associated with a first codebook for transport-block level acknowledgment feedback of the first group of downlink transmissions or a second downlink assignment indicator field associated with a second codebook for code-block-group level acknowledgment feedback of the first group of downlink transmissions;

determine, based at least in part on the configuration information for the group-based acknowledgment feedback and the downlink control information transmission, acknowledgment feedback associated with at least one of the first group of downlink transmissions or the second group of downlink transmissions; and transmit the acknowledgment feedback to the base station in the first uplink transmission.

9. The apparatus of claim 8, wherein the uplink total downlink assignment indicator fields for each of the first group of downlink transmissions and the second group of downlink transmissions further include one or more of a third downlink assignment indicator field associated with a third codebook for transport-block level acknowledgment feedback of the second group of downlink transmissions or a fourth downlink assignment indicator field associated with a fourth codebook for code-block-group level acknowledgment feedback of the second group of downlink transmissions.

10. The apparatus of claim 8, wherein the instructions to determine are further executable by the processor to cause the apparatus to:

determine, based at least in part on the uplink total downlink assignment indicator fields, that scheduling information from the base station was missed for one or more downlink transmissions of the first group of downlink transmissions.

11. The apparatus of claim 10, wherein the instructions to determine are further executable by the processor to cause the apparatus to:

insert a predetermined value for one or more feedback indicators associated with the missed scheduling information.

12. The apparatus of claim 11, wherein the predetermined value is inserted to provide a codebook size that corresponds with the uplink total downlink assignment indicator fields.

13. An apparatus, comprising:
a processor;
memory coupled with the processor; and
instructions stored in the memory and executable by the processor to cause the apparatus to:

transmit, to a user equipment (UE), configuration information for group-based acknowledgment feedback for at least a first group of downlink transmissions to the UE and a second group of downlink transmissions to the UE, wherein one or more of the first group of downlink transmissions or the second group of downlink transmissions are configured for acknowledgment feedback at a code-block-group level or a transport-block level;

transmit a downlink control information transmission to the UE that schedules a first uplink transmission in which acknowledgment feedback for one or more of the first group of downlink transmissions or the second group of downlink transmissions is to be multiplexed with uplink data in the first uplink transmission, wherein:

group-based acknowledgment feedback is to be provided for at least one of the first group of downlink transmissions or the second group of downlink transmissions;

the instructions to transmit the downlink control information transmission are further executable by the processor to cause the apparatus to transmit uplink total downlink assignment indicator fields for each of the first group of downlink transmissions and the second group of downlink transmissions;

the acknowledgment feedback is determined based at least in part on the uplink total downlink assignment indicator fields; and the uplink total downlink assignment indicator fields for each of the first group of downlink transmissions and the second group of downlink transmissions include one or more of a first downlink assignment indicator field associated with a first codebook for transport-block level acknowledgment feedback of the first group of downlink transmissions or a second downlink assignment indicator field associated with a second codebook for code-block-group level acknowledgment feedback of the first group of downlink transmissions; and receive the acknowledgment feedback from the UE in the first uplink transmission.

14. The apparatus of claim 13, wherein the uplink total downlink assignment indicator fields for each of the first group of downlink transmissions and the second group of downlink transmissions further include one or more of a third downlink assignment indicator field associated with a third codebook for transport-block level acknowledgment feedback of the second group of downlink transmissions or a fourth downlink assignment indicator field associated with a fourth codebook for code-block-group level acknowledgment feedback of the second group of downlink transmissions.

* * * * *